United States Patent [19]
Morishita et al.

[11] Patent Number: 5,627,565
[45] Date of Patent: May 6, 1997

[54] SPACE COORDINATES DETECTING DEVICE AND INPUT APPARATUS USING SAME

[75] Inventors: Ichiro Morishita, Sendai; Yuichi Yasuda; Yuichi Umeda, both of Iwaki; Arao Sato, Sendai; Junichi Saito, Iwaki; Masahiro Tanaka, Iwaki; Tomomitsu Muta, Iwaki; Masatoshi Uchio, Iwaki; Kazuhiro Katagiri, Sendai; Masaru Nakayama, Natori, all of Japan

[73] Assignee: Alps Electric Co., Ltd., Tokyo, Japan

[21] Appl. No.: 452,453

[22] Filed: May 26, 1995

[30] Foreign Application Priority Data

| | | | |
|---|---|---|---|
| May 26, 1994 | [JP] | Japan | 6-138182 |
| Sep. 28, 1994 | [JP] | Japan | 6-233234 |
| Oct. 5, 1994 | [JP] | Japan | 6-241505 |
| Oct. 13, 1994 | [JP] | Japan | 6-247878 |

[51] Int. Cl.[6] .................................................. G09G 5/08
[52] U.S. Cl. ............................ 345/158; 345/157; 356/375
[58] Field of Search ..................................... 345/158, 180, 345/157, 181; 359/142; 348/734; 340/825.72, 825.57; 356/375; G09G 3/02, 5/08

[56] References Cited

U.S. PATENT DOCUMENTS

| | | | |
|---|---|---|---|
| 4,550,280 | 10/1985 | Mueller et al. | 345/158 |
| 4,576,481 | 3/1986 | Hansen | 356/375 |
| 4,682,159 | 7/1987 | Davison | 345/158 |
| 4,796,019 | 1/1989 | Auerbach | 345/158 |
| 4,988,981 | 1/1991 | Zimmerman et al. | 345/158 |
| 5,045,843 | 9/1991 | Hansen | |
| 5,325,133 | 6/1994 | Adachi | 345/158 |
| 5,367,315 | 11/1994 | Pan | 345/156 |

Primary Examiner—Michael H. Lee
Attorney, Agent, or Firm—Guy W. Shoup; Patrick T. Bever

[57] ABSTRACT

According to the present invention there is provided a space coordinates detecting device wherein a detecting section for detecting light emitted from a light source is provided, thereby permitting detection of a relative angle between a light emitting sections and the detecting section and hence permitting application of the detecting device to an input apparatus. The detecting section is provided with a light sensing element 23 having quartered light sensing portions. In the light emitting section, distinguishable lights are emitted from two light sources. The lights thus emitted are throttled through apertures and applied as separate square light spots S16 and S17 to the light-sensitive surface of the light sensing element 23. By calculating a difference in the detected output among the quartered light sensing portions, it is possible to determine the center I1 of the square light spot S16 and the center I2 of the square light spot S17. A relative rotational angle of the light emitting section and the detecting section with respect to Z axis can be determined by calculating an inclination angle α on X-Y orthogonal coordinates of a line x connecting both centers I1 and I2.

35 Claims, 21 Drawing Sheets

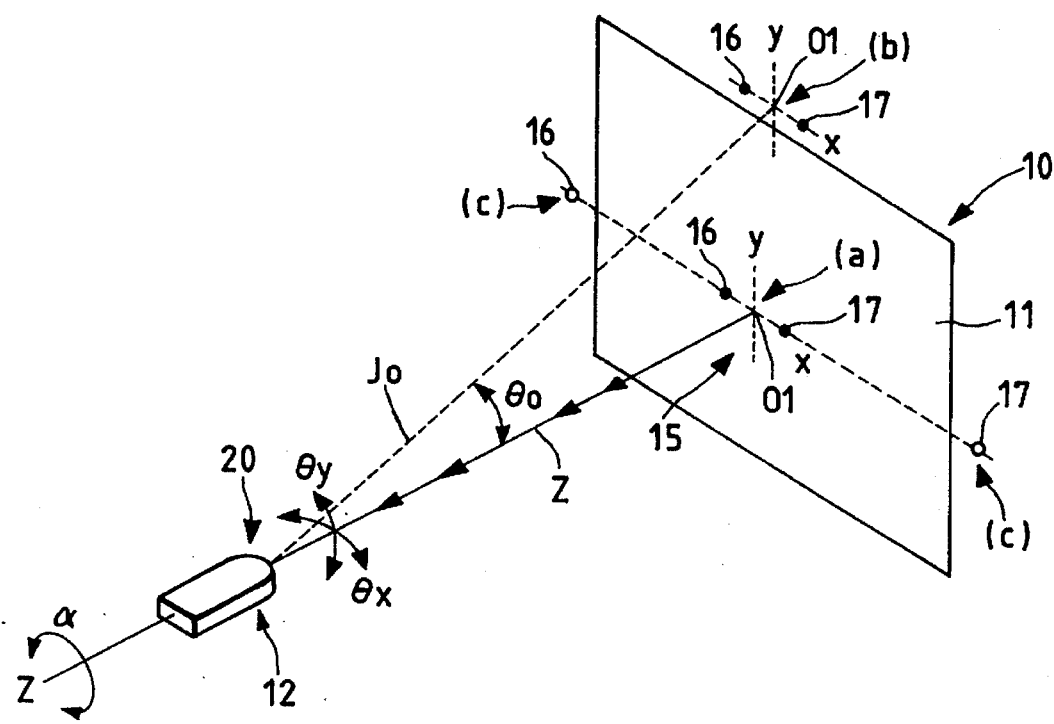
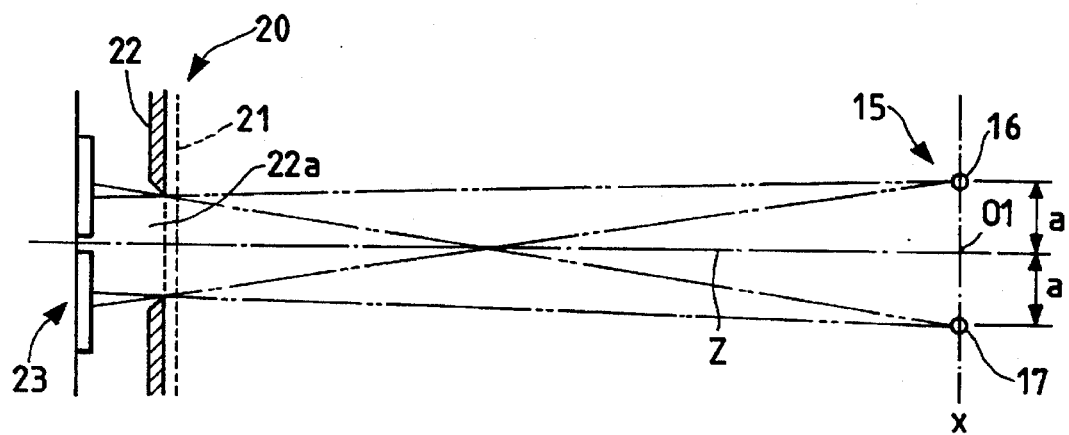
FIG. 2

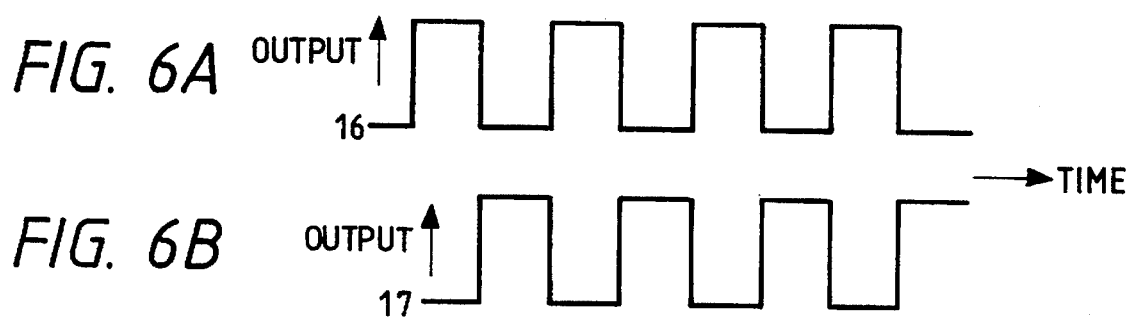
FIG. 6A
FIG. 6B
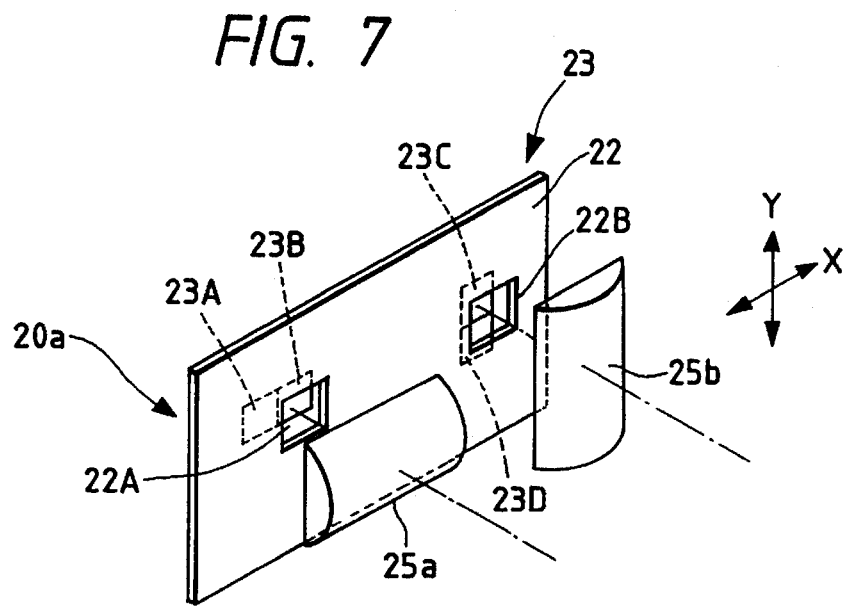
FIG. 7

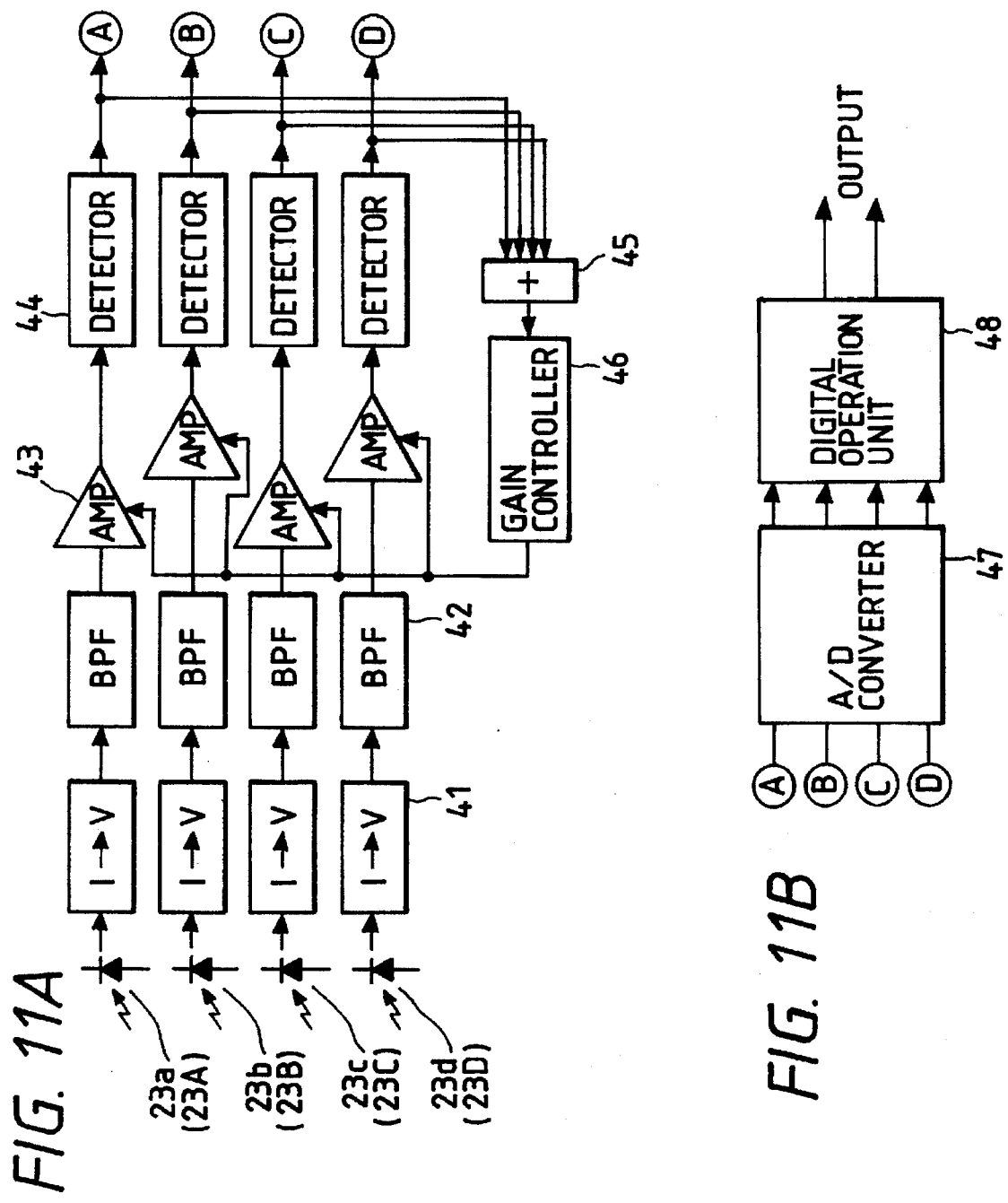

FIG. 33
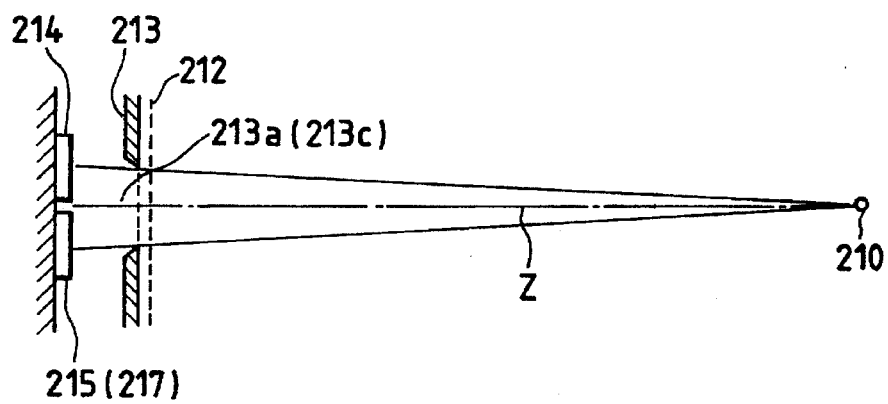
FIG. 34A  FIG. 34B  FIG. 34C
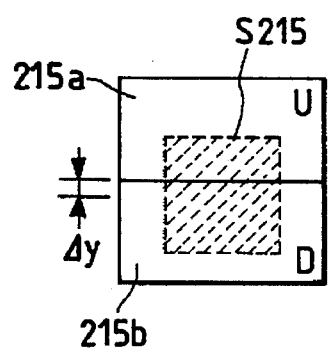 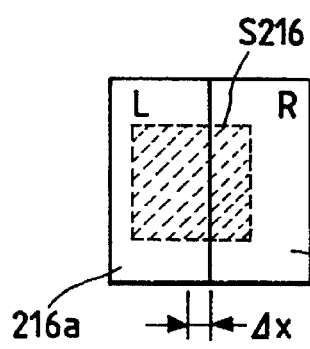 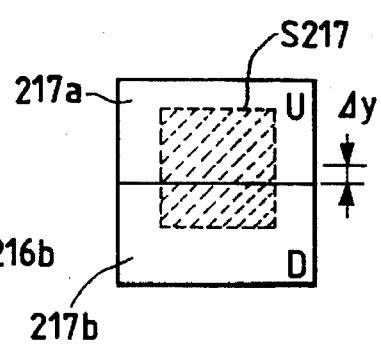

SPACE COORDINATES DETECTING DEVICE AND INPUT APPARATUS USING SAME

BACKGROUND OF THE INVENTION

1. Field of the Invention

The present invention relates to a space coordinates detecting device provided with a light emitting section having a light source and also provided with a detecting section which senses light emitted from the light source, the space coordinates detecting device being suitable for use in an input apparatus.

2. Description of the Related Art

Heretofore, as an input apparatus wherein information is inputted from the exterior to a screen for the display of various images, there has mainly been used a planar coordinates input apparatus or the like provided with a controller having a joy stick and also provided with switching elements arranged in a matrix form.

The controller having a joy stick is suitable for controlling the movement of characters or operation on the screen in an action game, but not suitable for such an operation as setting a cursor mark to a button which appears in any position on the screen. Besides, since this type of a controller is a cord type, there is a drawback that the controller can be operated only in the vicinity of the screen. On the other hand, the conventional planar coordinates input apparatus requires a wide space for installing a planar indication board in front of the screen; the structure thereof is complicated and its cost is high.

Recently, in view of the above-mentioned drawbacks, there has been proposed such an input apparatus using ultrasonic wave as shown in FIG. 40. In this input apparatus, sound sources 2a and 2b are disposed, for example, on both sides of a screen 1 of the apparatus body and spacedly in the direction of a horizontal axis (X axis). An operating member 3 to be operated manually by an operator is provided with a detecting section for detecting ultrasonic waves generated from the sound sources 2a and 2b. The ultrasonic waves are generated in a pulse-modulated state out of phase with each other. The detecting section of the operating member 3 receives the ultrasonic waves from the sound sources 2a and 2b while distinguishing the waves. Distance La from the sound source 2a and distance Lb from the sound source 2b are calculated, for example, on the basis of a phase difference between the ultrasonic waves received, whereby there are detected coordinates of the operating member 3 on a horizontal plane (Hx-Hz plane).

When the operating member 3 is moved on the horizontal plane (Hx-Hz plane) and an operating button is pushed as necessary, the information received in the operating member 3 is fed by wire or wireless to the apparatus body. In the apparatus body, the position of the operating member 3 on the Hx-Hz plane is calculated and, for example, a cursor mark 4 which has appeared on the screen 1 of the apparatus body is moved.

In the conventional input apparatus shown in FIG. 40, it is possible to detect coordinates of the operating member 3 on the horizontal plane (Hx-Hz plane) and provide the detected information to the apparatus body, but even when the operating member 3 is tilted in the direction of θx or θy while it is stopped in a certain position on the Hx-Hz plane, it is impossible to detect the tilt angle. It is also impossible to detect the angle of rotation of the operating member 3 in the θz direction. Further, although ultrasonic waves can be realized by a simple structure, they are poor in thermal stability and contain much disturbance noise. Thus, many problems still remain to be solved in point of reliability.

As a method not using ultrasonic waves there has been proposed a method which utilizes an alternating current magnetic field to determine position and angle in a three-dimensional space. However, this method requires a large-sized apparatus, which is very expensive.

SUMMARY OF THE INVENTION

The present invention has been accomplished in view of the abovementioned circumstances of the prior art and it is the object of the invention to provide a space coordinates detecting device which permits detection of relative rotational angle and distance between a light emitting section and a detecting section with a high accuracy using a simple structure.

In a space coordinates detecting device according to the present invention, a light emitting section and a detecting section are disposed in spaced relation to each other, the light emitting section having two light sources each adapted to emit a distinguishable light and spaced from each other, the detecting section having an aperture for making each light into a light spot of a predetermined area, the detecting section further having an X-axis light sensing portion for detecting movement in X axis direction of each light spot and a Y-axis light sensing portion for detecting movement in Y axis direction of each light spot when X-Y orthogonal coordinates intersecting an axis which passes through the center of the aperture are set, and there is provided a computing section which determines the position of each light spot on the basis of a difference in the amount of light received in the x-axis light sensing portion between both light spots and a difference in the amount of light received in the Y-axis light sensing portion and then determines a tilt angle of a line connecting the centers of both light spots on the above X-Y coordinates.

In a space coordinates detecting device according to the present invention, a light emitting section and a detecting section are disposed in spaced relation to each other, with a substantially linearly polarized light being emitted from the light emitting section, the detecting section having two filters for passing therethrough polarization components inclined in directions reverse to each other relative to the polarization direction of light emitted from the light emitting section, the detecting section further having light sensing portions for detecting the lights which have passed through the filters, and there is provided a computing section which determines a relative rotational angle of the light emitting section and the detecting section on the basis of a difference in the amount of received light between the lights which have passed through the filters.

Further, by using any of such space coordinates detecting devices according to the present invention it is made possible to provide an input apparatus wherein the light emitting section is disposed on one of a fixed apparatus body side and a movable operating member side, and information relating to a relative rotational angle of both light emitting section and detecting section with respect to an axis connecting both sections is inputted from the operating member to the apparatus body.

In a further aspect of the present invention there is provided a space coordinates detecting device wherein a light emitting section and a detecting section are disposed in positions spaced from each other, the light emitting section having two light sources each adapted to emit a distinguishable light and spaced from each other, the detecting section having a plurality of apertures for throttling the lights emitted from both light sources into light spots of a predetermined area and also having plural light sensing elements for sensing the light spots in an opposed relation to the apertures, the apertures being disposed in Y axis direction when arbitrary X-Y orthogonal coordinates are set, one of the light sensing elements being a Y-side light sensing element for detecting movement in the Y axis direction of the light spots and the remaining light sensing element being an X-Y side light sensing element for detecting movement in the X and Y axis directions of the light spots.

In a still further aspect of the present invention there is provided a space coordinates detecting device wherein a light emitting section and a detecting section are disposed in positions spaced from each other, the light emitting section having three light sources disposed spacedly from one another and adapted to emit lights distinguishable from one another, the detecting section having a plurality of apertures for throttling the lights emitted from the light sources into light spots of a predetermined area and also having three light sensing elements for sensing the light spots in an opposed relation to the apertures, one of the light sensing elements being a Y-side light sensing elements for detecting movement in Y axis direction of the light spots when arbitrary X-Y orthogonal coordinates are set, another light sensing element being an X-side light sensing element for detecting movement in the X axis direction of the light spots, and the remaining light sensing element being an X-Y side light sensing elements for detecting movement in both X and Y axis directions of the light spots, the Y-side light sensing element and the X-Y side light sensing element being disposed in the Y axis direction, the X-side light sensing element and the X-Y side light sensing element being disposed in the X axis direction.

In a still further aspect of the present invention there is provided a space coordinates detecting device wherein a light source and a detecting section are disposed in positions spaced from each other, the detecting section having three apertures for throttling light emitted from the light source into light spots of a predetermined area and also having three light sensing portions for sensing the light spots, the apertures being disposed in Y axis direction when arbitrary X-Y orthogonal coordinates are set, one of the light sensing portions being an X-side light sensing portion wherein the quantity of light received varies with movement in the X axis direction of the light spots, and the remaining two light sensing portions being Y-side light sensing portions wherein the quantity of light received varies with movement in the Y axis direction of the light spots.

In the space coordinates detecting device just mentioned above there is included an angle computing section which determines the angle of inclination between the direction connecting the light source with the detecting section and Z axis intersecting the X-Y orthogonal coordinates on the basis of the quantity of light received in at least one of both Y-side light sensing portions and that received in the X-side light sensing portion.

In the space coordinates detecting device there is further included a distance computing section which determines the distance between the light source and the detecting section on the basis of the quantities of lights received in both Y-side light sensing portions.

According to the present invention, distinguishable lights are emitted from two light sources disposed spacedly from each other in a light emitting section. For example, by emitting lights which have been modulated at a certain frequency, from both light sources, and by shifting the light emission timings (phases) in both light sources from each other, it is made possible to identify the lights in a detecting section. Alternatively, the lights emitted from both light sources may be rendered different in wavelength and modulation frequency so that the outputs detected by light sensing portions in the detecting section can be separated using a band-pass filter, thereby permitting the lights from both light sources to be distinguished from each other.

The lights emitted from the two light sources in the light emitting section pass through a throttle aperture in the detecting section and become light spots of a predetermined area, which light spots are received in quartered or bisected light sensing portions.

The spot positions of the lights emitted from the light sources can be detected each individually by determining the difference in the quantity of light received between the light sensing portions divided in the X axis direction in the detecting section and the difference in the quantity of light received between the light sensing portions divided in the Y axis direction. Further, a line passing through the centers of both light spots can be determined from the positions of both light spots and hence it is possible to detect the angle of the line on the X-Y orthogonal coordinates in the detecting section. As a result, it is possible to detect a relative rotational angle of the light emitting section and the detecting section with respect to a line connecting both sections.

Moreover, by setting rotatory coordinates $X\alpha - Y\alpha$ which are obtained by rotating the aforesaid X-Y orthogonal coordinates in the detecting section by the same angle as the above rotational angle, and by detecting the position of a middle point of both light spots on the $X\alpha - Y\alpha$ coordinates, it is possible to detect inclination angles of both sections in x and y axis directions while taking a relative rotational angle of both sections into account.

According to another means in the present invention, a linearly polarized light is emitted from a light emitting section, while a detecting section is provided with a pair of filter which transmit polarization components of opposite angles of, say, +45° and −45°, respectively, relative to the polarization direction of the light emitted from the light emitting section and is also provided with light sensing portions for detecting the lights which have passed through the filters. By comparing the quantities of lights received in both light sensing portions it is made possible to detect an inclination angle in the polarization direction of the light from the light source relative to the polarization direction of both filters, whereby it is possible to detect a relative rotational angle of both light emitting section and detecting section relative to the axis connecting both sections.

When distinguishable lights are emitted from two light sources of a light emitting section and spot positions of the lights are determined in divided light sensing portions of a detecting section, the distance between the light emitting section and the detecting section can be detected on the basis of the distance between the centers of both light spots and spacing between the light sources in the light emitting section.

By disposing the light emitting section and the detecting section in the foregoing space coordinates detecting device separately in the apparatus body and in the operating member, it is possible to detect the direction (posture) of the operating member relative to the apparatus body. Accordingly, by directing the operating member to any posture and then pushing an operating button, it becomes possible to input a three-dimensional position information to the apparatus body.

By using the foregoing space coordinates detecting device or input apparatus it is possible to input a coordinate position through the operating member to the apparatus having a screen. It is also possible to perform operations while setting a cursor mark to a push-button which has appeared on the screen. Further, it is possible to make use as an angle detector or a position or angle input apparatus in virtual reality.

According to the present invention, moreover, distinguishable lights are emitted from two spaced light sources in a light emitting section, then pass through plural apertures in a detecting section and become light spots of a predetermined area, which light spots are received by plural light sensing elements. One of the light sensing elements is a Y-side light sensing element for detecting movement in Y axis direction of the light spots, while the remaining light sensing element is an X-Y side light sensing element for detecting movement in X and Y axis directions of the light spots. By combining the two light sources with the plural light sensing elements it is made possible to make division into two optical systems in one of which the lights from both light sources are radiated to the Y-side light sensing element and the X-Y side light sensing element and in the other of which the lights from both light sources are directed to the X-Y side light sensing element.

In the first optical system, displacements in the Y axis direction of both light spots radiated to the Y-side light sensing element, as well as displacements in the Y axis direction of both light spots radiated to the X-Y side light sensing element, are detected, and on the basis of the results of the detection it is possible to determine the positions of both light sources on coordinates which have been set in the detecting section for example. Once coordinates of both light sources are decided, a relative angle θy between the light emitting section and the detecting section is determined on the basis of an inclination of a straight line passing through both light sources. Further, by setting rotatory coordinates which are obtained by rotating the same angle as the angle θy and by transforming the coordinates of a middle point between both light sources into the rotatory coordinate system, there are obtained a relative displacement in the Y axis direction of the light emitting section and the detecting section as well as a relative displacement in the Z axis direction of both sections.

In the second optical system, displacements in X and Y axis directions of both light spots directed to the X-Y side light sensing element are detected, and on the basis of the results of the detection it is possible to determine the positions of both light spots. Then, an inclination of a straight line passing through the centers of both light spots is determined from the positions of both light spots and there is obtained a relative rotational angle θz of the light emitting section relative to a line connecting both sections. Moreover, by transforming the coordinates of a middle point between both light spots into a rotatory coordinate system corresponding to θz rotation there are obtained relative inclination angles θx and θy of the light emitting section and the detecting section. Further, from the positions of both light spots and the distance between both light sources and in accordance with the principle of trigonometrical measurement there is obtained a relative displacement in the Z axis direction of the light emitting section and the detecting section.

According to the present invention, moreover, distinguishable lights are emitted from three spaced light sources in a light emitting section, then pass through plural apertures in a detecting section and become light spots of a predetermined area, which light spots are received by three light sensing elements. One of the light sensing elements is a Y-side light sensing element for detecting movement in Y axis direction of the light spots, another light sensing element is an X-side light sensing element for detecting movement in X axis direction of the light spots, and the remaining light sensing element is an X-side light sensing element for detecting movement in X and Y axis directions of the light spots. By combining the three light sources with the three light sensing elements it is made possible to make division into three optical systems in the first of which the lights from the two light sources are radiated to the Y-side light sensing element and the X-Y side light sensing element, in the second of which the lights from the two light sources are radiated to the X-side light sensing element and the X-Y side light sensing element and in the third of which the lights from the two light sources are radiated to the X-Y side light sensing element.

More specifically, in the first optical system, like the first optical system noted previously, there is obtained a relative displacement in Y and Z directions of the light emitting section and the detecting section.

In the second optical system there are determined displacements in the X axis direction of both light spots radiated to the X-side light sensing element and displacements in the X axis direction of both light spots radiated to the X-Y side light sensing element, and on the basis of the results of the detection it is possible to determine positions of both light sources on coordinates which have been set in the detecting section for example. Once the coordinates of both light sources are decided, a relative angle θx between the light emitting section and the detecting section is determined from an inclination of a straight line passing through both light sources. Further, by setting rotatory coordinates corresponding to the same angle of rotation as the angle θx and transforming the coordinates of a middle point between both light sources into the rotatory coordinate system there are obtained a relative displacement in the X axis direction of the light emitting section and the detecting section as well as a relative displacement in the Z axis direction of both sections.

In the third optical system, like the second optical system explained previously, there are obtained relative inclination angles θx and θy of the light emitting section and the detecting section. Further, from the positions of both light spots and the distance between both light sources and in accordance with the principle of trigonometrical measurement there is obtained a relative displacement in the Z axis direction of the light emitting section and the detecting section.

Moreover, the lights emitted from the light sources pass through three apertures in the detecting section and become light spots of a predetermined area, which light spots are received by three light sensing sections comprising one X-side light sensing portion and two Y-side light sensing portions. The X-side light sensing portion detects displacement in the X axis direction of the light spots applied thereto, while the Y-side light sensing portions detect displacements in the Y axis direction of the light spots applied thereto.

In connection with a relative inclination angle between the direction connecting each light source and the Z axis which intersects the X-Y orthogonal coordinates, if the angle in the X axis direction is θx and the angle in the Y axis direction is θy, the angle θx is determined by computing the output from the X-side light sensing portion which computation is made by the angle computing section, while the angle θy is determined by computing the output from one Y-side light sensing portion or a mean value of outputs from both Y-side light sensing portions.

If a relative distance between each light source and the detecting section is L, since the positions of the light spots applied to both Y-side light sensing portions vary according to the size of L, the L is determined by computing the outputs from both Y-side light sensing portions which computation is performed by the distance computing section.

BRIEF DESCRIPTION OF THE DRAWINGS

FIG. 1 is a perspective view of an input apparatus using a space coordinates detecting device according to the first embodiment of the present invention;

FIG. 2 is a sectional plan view of the detecting device in the first embodiment;

FIGS. 6A and 6B are waveform diagrams of drive pulses for causing light sources to emit lights in the first embodiment;

FIG. 7 is a perspective view of a detecting section according to a modification of the first embodiment;

FIGS. 11A and 11B are block diagrams showing an example of circuit of the space coordinates detecting device in each of the above embodiments;

FIG. 33 is a sectional view thereof;

FIGS. 34A, 34B and 34C are plan views of a light sensing portion used therein;

DETAILED DESCRIPTION OF THE PREFERRED EMBODIMENTS

Figure 3:
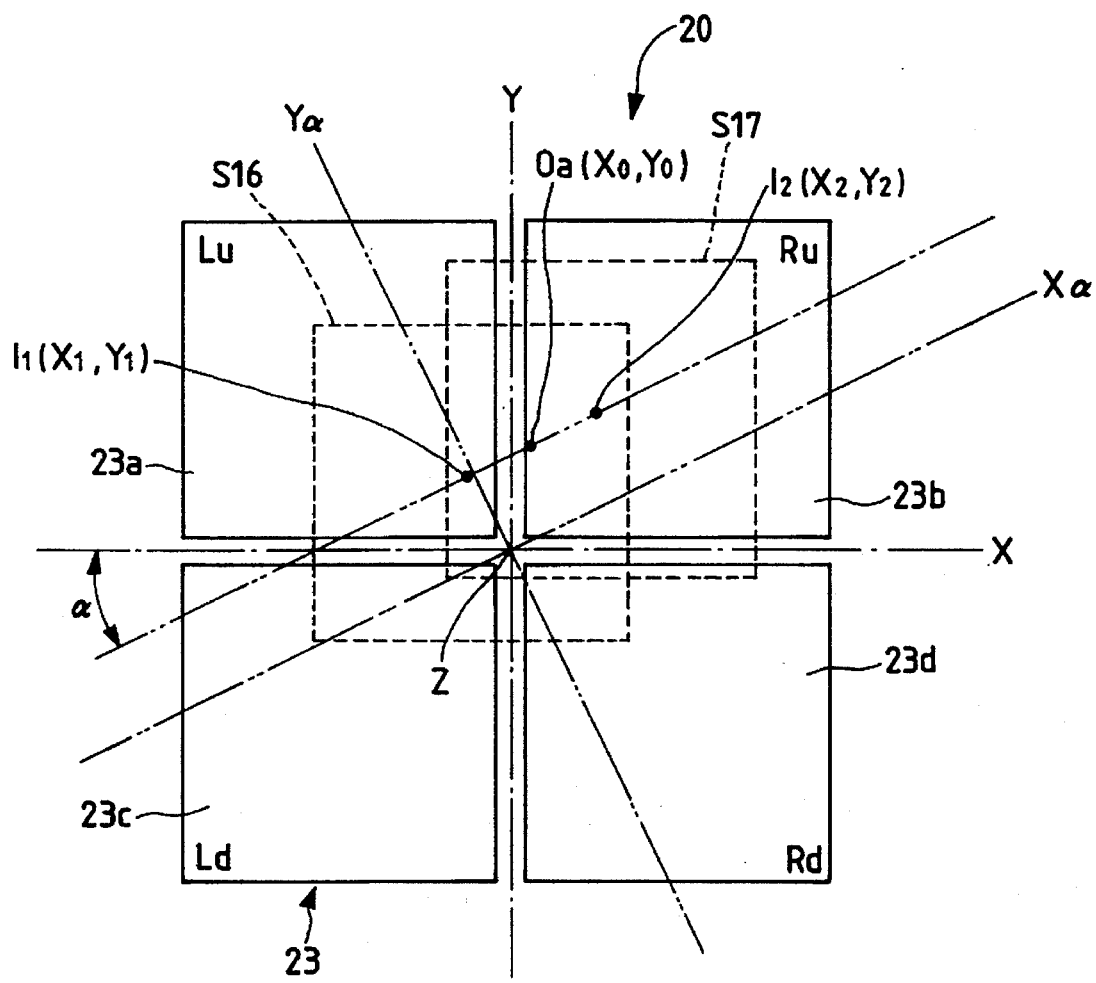
FIG. 3 is an enlarged front view of a detecting section in the first embodiment as seen in Z axis direction.

FIG. 1 is a perspective view of an input apparatus using a space coordinates detecting device according to the first embodiment of the present invention, and FIGS. 2 to 6 illustrate a basic structure and operation of the space coordinates detecting device.

This input apparatus includes an apparatus body 10 on a stationary side thereof, the apparatus body being, for example, the body of a computer, an AV apparatus, or a game machine, and having a CRT screen 11. On a moving side thereof is disposed an operating member 12. The operating member 12 functions as a remote controller and has a size capable of being held by hand. The operating member 12 and the apparatus body 10 are connected with each other using cord, or detected information (mainly detected angle information) or a manipulation indicating signal is provided from the operating member 12 to the apparatus body 11 by infrared-ray communication or radio wave communication.

The input apparatus is provided with a space coordinates detecting device. In the embodiment illustrated in FIG. 1, a light emitting section 15 is provided on the apparatus body 10 side, while a detecting section 20 is provided on the operating member 12 side. The light emitting section 15 and the detecting section 20 constitute a space coordinates detecting device according to the present invention.

When a horizontal axis passing through the center O1 of the light emitting section 15 is x axis and a vertical axis passing through the center O1 is y axis, a pair of point light sources 16 and 17 are disposed in positions spaced an equal distance, a, (see FIG. 2) with respect to the center O1 on the x axis.

In FIG. 1, the center O1 of the light emitting section 15 is shown in the position of the center (a) of the screen 11, and the point light sources 16 and 17 are shown so as to be present within the screen 11.

In the actual apparatus, however, the center O1 of the light emitting section 15 lies in a position outside the screen 11, say, the position indicated at (b). In this case, when Z axis extending perpendicularly (horizontally in FIG. 2) to the detecting section 20 of the operating member 12 is directed to the center of the screen 11, there arises an offset angle θo between a line Jo and the Z axis which line Jo connects the center of the detecting section 20 in the operating member 12 with the center of the light emitting section 15. In the actual input device and space coordinates detecting device, the offset angle θo is substracted from a detected angle in the Y direction detected by the detecting section 20 of the operating member 12, whereby the direction (opposition angle) θy of the Z axis relative to the screen is calculated.

Alternatively, if the center O1 of the light emitting section 15 is positioned centrally of the screen 11 and the point light sources 16 and 17 are disposed in right and left side positions (c) outside the screen 11 and lying on the x axis passing through the center O1, the subtraction of the offset angle θo becomes unnecessary.

Anyhow, for ease of explanation relating to the construction and operation of the space coordinates detecting device, the following description is provided on the assumption that the center O1 of the light emitting section 15 is positioned at the center (a) of the screen 11.

Lights which are distinguishable from each other are emitted from the two point light sources 16 and 17. For example, the point light sources 16 and 17 are infrared-emitting diodes, from which there are outputted modulated lights of the same frequency (period) and 180° out of phase with each other. FIG. 6A illustrates a drive pulse for causing one point light source 16 to emit light, while FIG. 6B illustrates a drive pulse for causing another point light source 17 to emit light. The point light sources 16 and 17 emit modulated lights by virtue of the drive pulses having a frequency of about 16 to 40 kHz. The light emission period of the light source 16 and that of the light source 17 shift from each other by 180° so that infrared rays are emitted alternately at timings different from each other.

In the detecting section 20 provided in the operating member 12, as shown in FIG. 2, a visible light cut-off filter 21, a throttle plate 22 and a light sensing element 23 are disposed in this order successively from the light emitting section 15 and in parallel with one another.

In the throttle plate 22 is formed a square throttle aperture 22a. The axis passing through the center of the throttle aperture 22a and perpendicular to the throttle plate 22 and light sensing element 23 is assumed to be the Z axis mentioned previously, and X-Y orthogonal coordinates orthogonal to the Z axis are set in the detecting section 20. As shown in FIG. 3, the light sensing element 23 is constituted by a pin photodiode having quartered light sensing portions 23a, 23b, 23c and 23d. In the above X-Y orthogonal coordinates, the set of the divided light sensing portions 23a, 23b and the set of 23c, 23d are divided in the Y axis direction from each other, while the set of 23b, 23d and the set of 23a, 23c are divided in the X axis direction from each other.

The infrared lights emitted at different timings (periods) from the point light sources 16 and 17 are throttled by the square throttle aperture 22a and radiated as square spots onto the light sensing element 23. In FIG. 3, the square infrared light spot from the light source 16 is indicated at S16 and that from the light source 17 indicated at S17. The area of the throttle aperture 22a, the area of each of the light sensing portions 23a, 23b, 23c and 23d, and the distance m between the light-sensitive surface of the light sensing element 23 and the surface of the throttle plate 22, are set so that the square light spots S16 and S17 do not deviate from the light-sensitive area of the quartered light sensing portions 23a–23d.

Further, since the visible light cut-off filter 21 is provided, extraneous light noise components other than the square infrared light spots S16 and S17 are cut off as much as possible.

In each of the divided light sensing portions 23a to 23d there is obtained a detection current by photoelectric conversion based on the irradiation area of each square light spot. The detection current is then converted to a voltage and subjected to an arithmetic processing, although reference to the processing circuit will be made later. Detection outputs based on irradiation areas of the square light spots in the divided light sensing portions 23a to 23d are indicated at Lu, Ru, Ld and Rd in FIG. 3.

As mentioned above, since infrared lights are emitted at different timings from the point light sources 16 and 17, the time at which the square light spot S16 is detected and the time when the square light spot S17 is detected, in the light sensing element 23, are different, so that by making time-division in the processing circuit there are obtained the detection outputs Lu, Ru, Ld and Rd for each of the square light spots S16 and S17.

Reference will be made below to the angle detecting operation performed in the space coordinates detecting device comprising the light emitting section 15 and the detecting section 20.

FIG. 3 shows square spot lights S16 and S17 detected by the detecting section 20 when the operating member 12 is in a certain posture.

The detection state shown in FIG. 3 results from counterclockwise rotation of the operating member 12 relative to the Z axis. This rotation angle is assumed to be α. In other words, the detection state shown in FIG. 3 results from a relative rotation by the angle of the x axis on the light emitting section 15 side where the point light sources 16 and 17 are disposed with respect to the X axis of the X-Y orthogonal coordinates on the detecting section 20 side.

In FIG. 3, the center of the square light spot S16 of the infrared light from the light source 16 is indicated at I1, while the center of the square light spot S17 from the infrared light from the light source 17 is indicated at I2. Further, a coordinate position of the center I1 and that of the center I2 on the X-Y orthogonal coordinates on the detecting section 20 side are represented as (X1, Y1) and (X2, Y2), respectively. If the point of intersection between a line J1 (see FIG. 4) connecting the center O1 of the light emitting section 15 with the center of the throttle aperture 22a and the upper surface of the light sensing element 23 is assumed to be Oa, this intersecting point Oa is positioned at a middle point between I1 and I2. A coordinate position of the intersecting point Oa on the X-Y orthogonal coordinates of the detecting section 20 is assumed to be (X0, Y0).

If tan α is determined on the X-Y orthogonal coordinates shown in FIG. 3, the result is as follows:

$$\tan\alpha = (Y_2-Y_1)/(X_2-X_1) \qquad \text{(Expression 1)}$$

Therefore, the rotation angle α of the operating member 12 and detecting section 20 relative to the Z axis is as follows:

$$\alpha = \tan^{-1}[(Y_2-Y_1)/(X_2-X_1)] \qquad \text{(Expression 2)}$$

In the above Expression 1, X1 and X2 can be obtained by taking a difference between the quantity of light received in the set of divided light sensing portions 23b, 23d and that of light received in the set of divided light sensing portions 23a, 23c, both sets being divided in the X axis direction, with respect to the square light spots S16 and S17 of infrared lights which are generated at different timings from the light sources 16 and 17, respectively. Likewise, Y1 and Y2 can be obtained by taking a difference between the quantity of light received in the set of divided light sensing portions 23a, 23b and that of light received in the set of divided light sensing portions 23c, 23d, both sets being divided in the Y axis direction, with respect to the square light spots S16 and S17. That is, the received outputs Lu, Ru, Ld, Rd in the divided light sensing portions and the coordinates X1, X2, Y1, Y2 are in such proportional relations as represented by the following Expression 3. Accordingly, by performing arithmetic operations for the received outputs, it is possible to determine X1, X2, Y1 and Y2, namely the positions of the square light spots S16 and S17 on the X-Y orthogonal coordinates of the detecting section 20.

$$X_1, X_2 \propto [(Ru+Rd)-(Lu+Ld)]/(Ru+Lu+Rd+Ld)$$

$$Y_1, Y_2 \propto [(Ru+Lu)-(Rd+Ld)]/(Ru+Lu+Rd+Ld) \qquad \text{(Expression 3)}$$

By performing the arithmetic operation of the above Expression 3 and further performing the operation of Expression 1 or 2 it is possible to obtain a relative rotation angle α of the operating member 12 and detecting section 20 with respect to the Z axis. In the calculation of Expression 1 or Expression 2, the above angle α can be determined easily by setting the value of (Y2-Y1)/(X2-X1) and the corresponding angle α beforehand in a table, for example by means of a digital operation unit (computing section) 48 shown in FIG. 11B and then by making reference to the table.

In the detection state of FIG. 3, the operating member 12 and the detecting section 20 are in a rotated state by the angle α relative to the Z axis; besides, the detecting section 20 shown in FIG. 3 is provided in the operating member 12 as the moving side. Consequently, the X-Y orthogonal coordinates of the detecting section 20 are in a rotated state by the angle α relative to the x-y orthogonal coordinates (fixed to space) on the apparatus body 10 side. On the other hand, inclination information given to the apparatus body 10 from the operating member 12 must comprise angles θx and θy relative to the x-y orthogonal coordinates on the apparatus body 10 side.

In FIG. 3, therefore, there are set rotatory coordinates Xα–Yα corresponding to a rotation by the angle α relative to the X-Y orthogonal coordinates fixed to the detecting section 20. The position of the center Oa on the said coordinates is given as per the following Expression 4:

$$X_\alpha = X_o \cos\alpha + Y_o \sin\alpha$$

$$Y_\alpha = -X_o \sin\alpha + Y_o \cos\alpha \qquad \text{(Expression 4)}$$

X1 and X2 can be determined by the following Expression 5:

$$X_o = (X_1+X_2)/2$$

$$Y_o = (Y_1+Y_2)/2 \qquad \text{(Expression 5)}$$

Figure 4:
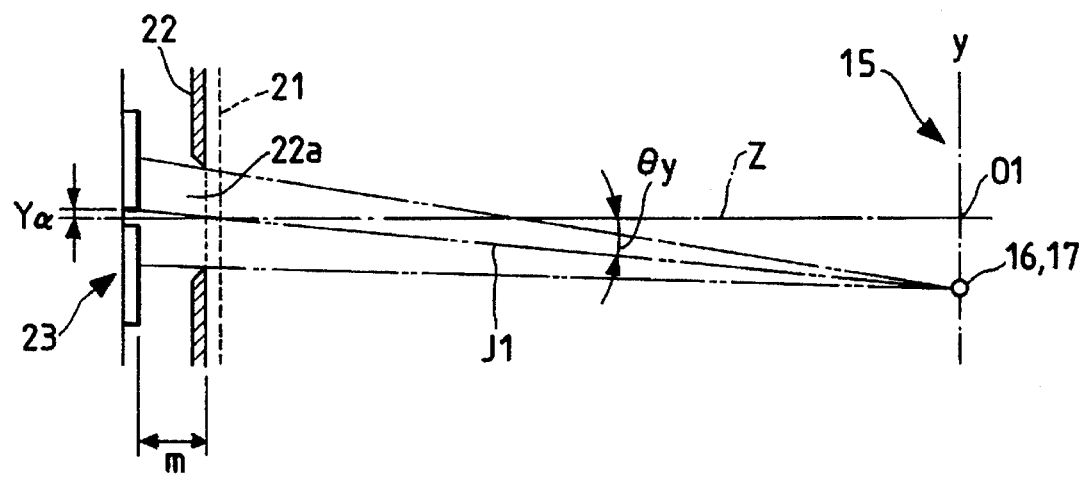
FIG. 4 is a sectional side view of the detecting device in the first embodiment.

By determining the above Xα and Yα it is possible to obtain inclination angles θx and θy (unit: radian) of the Z axis based on the x-y coordinates on the apparatus body 10 side. Although FIG. 4 illustrates θy, this is also the case with θx. If the distance between the throttle aperture 22a and the surface of the light sensing element 23 is m, since this distance m is very small, the relation between Xα and θx and the relation between Yα and θy are given as in the following Expression 6:

$$X_\alpha = m \tan\theta x \approx m\theta x$$

$$Y_\alpha = m \tan\theta y \approx m\theta y \qquad \text{(Expression 6)}$$

Thus, by performing the operation of Expression 3 for the detected outputs Lu, Ru, Ld and Rd provided from the divided light sensing portions 23a–23d and by further performing the operation of Expression 1 or 2, it is possible to determine the rotation angle α of the operating member 12 relative to the Z axis. Also, on the basis of this angle α it is possible to determine Xα and Yα from Expression 4 and also determine, from the values of Xα, Yα and m, the inclination angles θx and θy of the Z axis with respect to the x-y coordinates of the apparatus body 10. Since the Z axis is perpendicular to the light-sensitive surface of the detecting section 20 in the operating member 20, the inclination angle of the operating member relative to the x-y coordinates of the apparatus body 10 can be detected by determining θx and θy.

Figure 5:
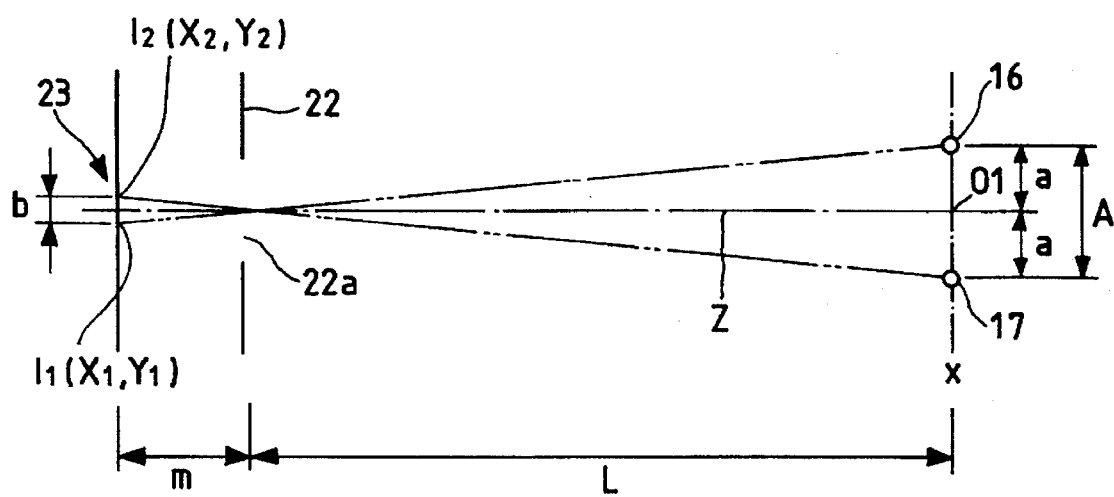
FIG. 5 is an explanatory view showing arrangement and sizes of various portions of the detecting device in the first embodiment.

In the space coordinates detecting device being considered, it is also possible to determine the distance L (see FIG. 5) in the Z axis direction between the light emitting section 15 and the detecting section 20. As shown in FIG. 5, if the spacing in the x axis direction between the point light sources 16 and 17 in the light emitting section 15 is 2·a=A and the straight-line distance between I1 and I2 at the light-sensitive surface of the light sensing element 23 is b, these are in such a relation as Expression 7:

$$L/m = A/b$$

$$L = (A/b)m \qquad \text{(Expression 7)}$$

In the Expression 7, b can be determined from the positions of I1 (X1, Y1) and I2 (Y1, Y2 ) on the X-Y orthogonal coordinates on the detecting section 20 side and in accordance with the following Expression 8:

$$b = \sqrt{(X_1-X_2)^2 + (Y_1-Y_2)^2} \qquad \text{(Expression 8)}$$

Thus, from the detected outputs provided from the divided light sensing portions it is possible to determine X1, Y1, X2 and Y2 in accordance with Expression 3, determine b in accordance with Expression 8 and further determine the distance L in accordance with Expression 7.

The above arithmetic operations are performed within the operating member 12 and the results thereof are transmitted to the apparatus body 10 by wire or wireless, or only the detected outputs in the detecting section 20 are transmitted to the apparatus body 10 and the above operations are performed on the apparatus body 10 side.

According to this input apparatus, even when the operating member 12 rotates in the α direction relative to the Z axis, the inclination angles θx and θy in the x and y directions relative to the x-y coordinates (fixed coordinates in space) on the apparatus body 10 side can be detected taking the rotation angle α into consideration. Therefore, even if the operating member 12 held by hand is in a rotated state in the e direction, it is possible to give information based on the inclinations θx and θy to the apparatus body 10. For example, a cursor mark displayed on the screen 11 can be moved on the x-y coordinates. That is, by moving the operating member 12 freely in the space it becomes possible to make inputs for instructing image processing on the screen 11 such as, for example, drawing a line or setting the cursor mark to a button indication on the screen and conducting switching operation to change over the picture plane from one to another. In this case, even if the operating member 12 held by hand should rotate relative to the Z axis, there is no fear of this rotation causing malfunction of the input action for the x-y coordinates.

In the input apparatus and space coordinates detecting device being considered, the rotation angle α of the operating member 12 and detecting section 20 relative to the Z axis can be utilized as directive information for the display on the screen 11 of the apparatus body 10. For example, by turning the operating member 12 in the α direction, an image which has appeared on the screen 11 can be rotated within the x-y coordinates on the apparatus body side. This can be utilized in character rotating motion in plotting or in software for a game machine.

If the cursor mark is moved on the screen 11 on the basis of only inclination angles in the θx and θy directions of the operating member 12 in FIG. 1, there will arise a difference in the operation touch between the state where the operating member 12 is close to the screen 11 and the state where it is positioned away from the screen. If the operating member 12 is tilted by the same angle for example in the θx direction in both position of the operating member close to the screen 11 and position sufficiently spaced from the screen, the cursor mark will move by the same distance on the screen on the basis of information of such inclination angle θx. Consequently, when the operating member 12 is tilted in a position away from the screen 11, it provides a touch of little movement of the cursor mark on the screen.

Therefore, the above difference in the touch can be compensated for by making correction while taking into account the distance L which is determined by Expression 7. For example, correction is made in such a manner that with increase in the distance L between the light emitting section 15 and the detecting section 20, the moving distance of the cursor mark on the screen 11 becomes longer for the inclination of the operating member 12 in the θx or θy direction. By so doing it is made possible to compensate for the difference in the operation touch between the case where the operating member 12 is close to the screen 11 and the case where it is positioned away from the screen.

Conversely, when the operating member 12 is spaced fairly long from the screen 11, the above correction may result in that a slight tilt of the operating member causes a large movement of the cursor mark on the screen, leading to error of the operation input due to hand shaking. This can be prevented by making correction reverse to the above in such a manner that when the distance L becomes long, the moving distance of the cursor mark on the screen 11 is kept short relative to inclinations θx and θy of the operating member 12.

Figure 8:
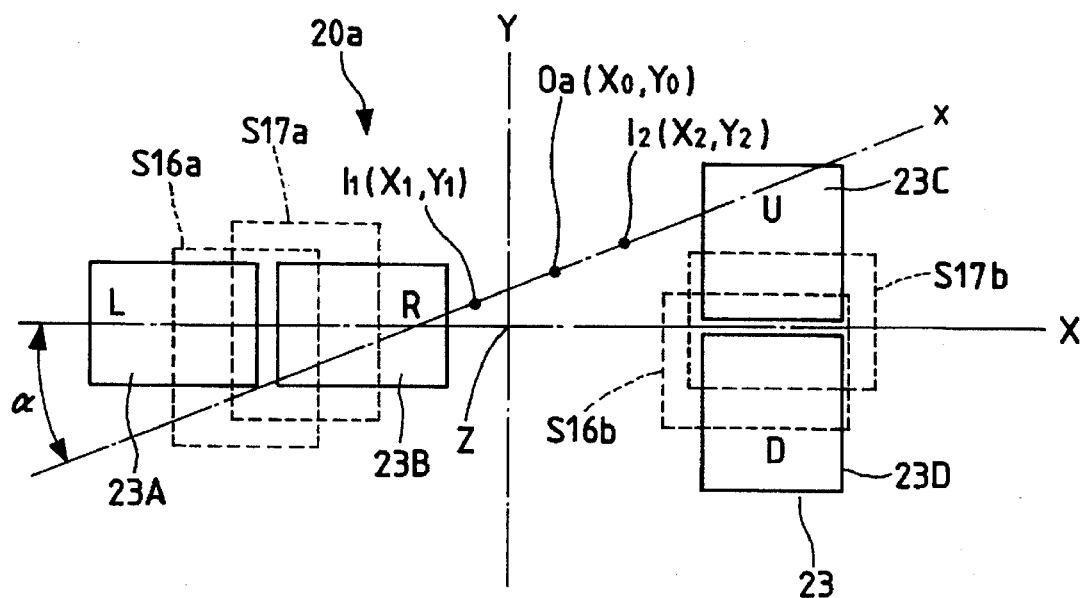
FIG. 8 is an enlarged front view thereof.

FIGS. 7 and 8 illustrate a modification of the above first embodiment.

According to the illustrated modification, a light sensing element 23 provided in a detecting section 20a has, in X-Y orthogonal coordinates on the detecting section side, bisected light sensing portions 23A and 23B divided in X axis direction and bisected light sensing portions 23C and 23D divided in Y axis direction. In front of those two sets of bisected light sensing portions are positioned throttle apertures 22A and 22B, respectively, of a throttle plate 22. Further, in front of the throttle apertures 22A and 22B on the light source side are provided cylindrical lenses 25a and 25b, respectively. The bisected light sensing portions 23A, 23B and like portions 23C, 23D are disposed in extremely close proximity to each other.

As shown in FIG. 8, by the provision of the cylindrical lenses, light spots formed in the bisected light sensing portion 23A and 23B are focused in the Y axis direction and not focused in the X axis direction, while light spots formed in the bisected light sensing portions 23C and 23D are focused in the X axis direction and not focused in the Y axis direction.

The detecting section 20a shown in FIGS. 7 and 8 are provided in the operating member 12 shown in FIG. 1. When the operating member 12, or the detecting section 20a, rotates by the angle α relative to Z axis, in the bisected light sensing portions 23A and 23B shown on the left-hand side, infrared light emitted from the light source 16 is focused by the cylindrical lens 25a and throttled by the throttle aperture 22A into a square light spot S16a, which becomes incident on the light-sensitive surfaces of the bisected light sensing portions 23A and 23B. Likewise, infrared light emitted from the light source 17 is made into a square light spot S17a, which becomes incident on the light-sensitive surfaces.

In the same manner as above, in the bisected light sensing portions 23C and 23D on the right-hand side, the infrared light from the light source 16 is radiated as a square light spot S16b to the light-sensitive surfaces of those light sensing portions, while the infrared light from the light source 17 is directed as a square spot light S17b to the light-sensitive surfaces. Since the left and right bisected light sensing portions 23A, 23B and 23C, 23D are disposed at a sufficiently short distance as compared with the distance L from the light emitting section 15, coordinate positions X1, Y1 and X2, Y2 of I1 and I2 shown in FIG. 3 can be determined in an approximate manner by performing the arithmetic operation of the following Expression 9 on the assumption that the received outputs in the divided light sensing portions 23A to 23D are L, R, U and D:

$$X_1, X_2 \propto (R-L)/(R+L)$$
$$Y_1, Y_2 \propto (U-D)/(U+D) \qquad \text{(Expression 9)}$$

The X1, X2, Y1 and Y2 obtained by Expression 9 represent approximate coordinates of the square spot positions of infrared lights emitted from the light sources 16 and 17, so by performing the arithmetic operation of Expression 1 or 2 on the basis of those values it is possible to determine a relative rotation angle α of the operating member 12 and detecting section 20a with respect to the Z axis. Also, using Expressions 4, 5 and 6, it is possible to determine inclination angles θx and θy relative to the x-y orthogonal coordinates on the apparatus body 10 side. Further, in accordance with Expression 7 it is possible to determine the distance L between the light emitting section 15 and the detecting section 20a in an approximate manner.

In the embodiment of FIG. 8 it is necessary that in the divided light sensing portions 23A and 23B on the left-hand side the square light spots S16a and S17a should not deviate in the Y axis direction with respect to the light-sensitive surfaces, while in the divided light sensing portions 23C and 23D on the right-hand side the square light spots S16b and S17b should not deviate in the X axis direction with respect to the light-sensitive surfaces. This can be attained by widening the area of each of the throttle apertures 22A and 22B.

The cylindrical lenses 25a and 25b are not always necessary, but by using those cylindrical lenses the lights from the light sources 16 and 17 are focused and detected in the Y and X axis directions, so the utilization efficiency of the lights becomes higher and hence it becomes possible to increase the S/N ratio (signal-to-noise ratio).

Figure 9:
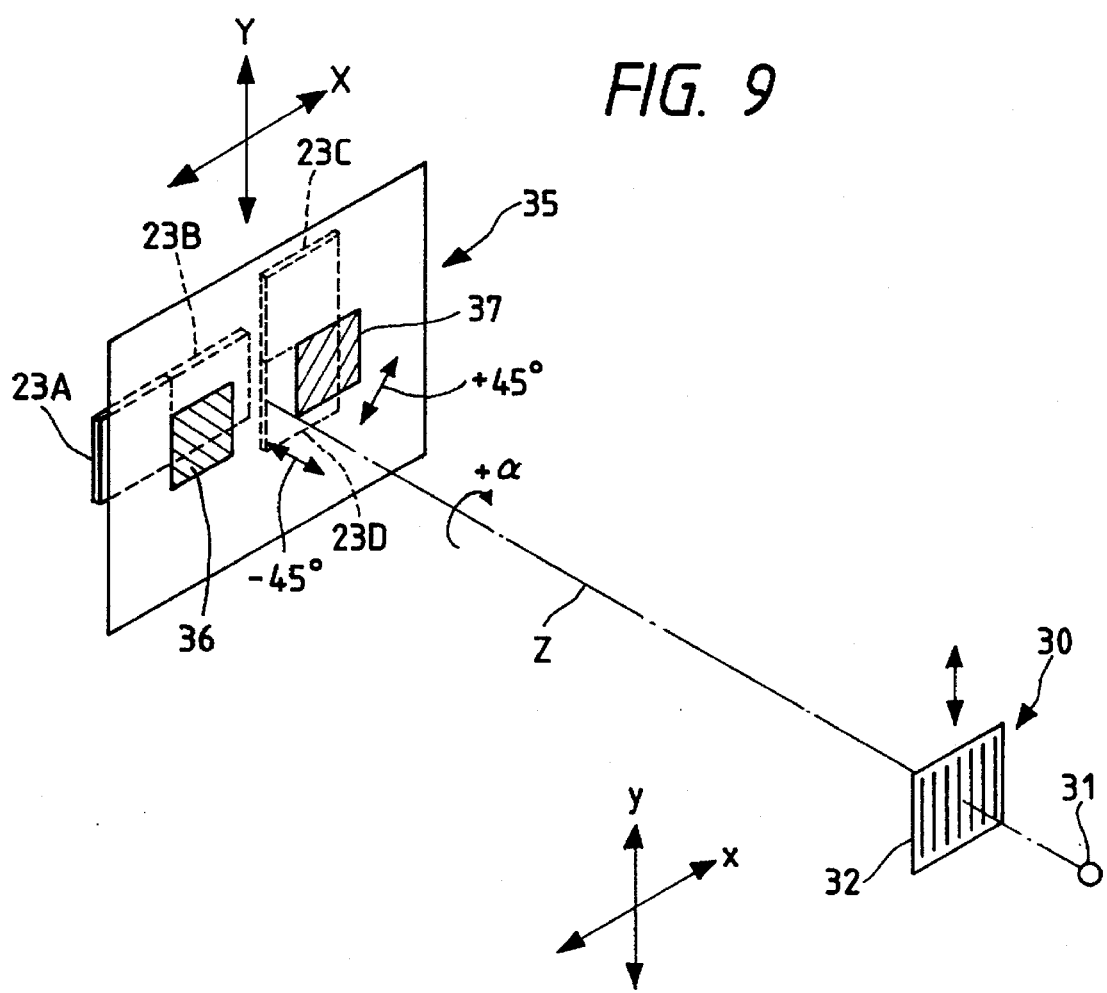
FIG. 9 is a perspective view of a space coordinates detecting device according to the second embodiment of the present invention.
Figure 10:
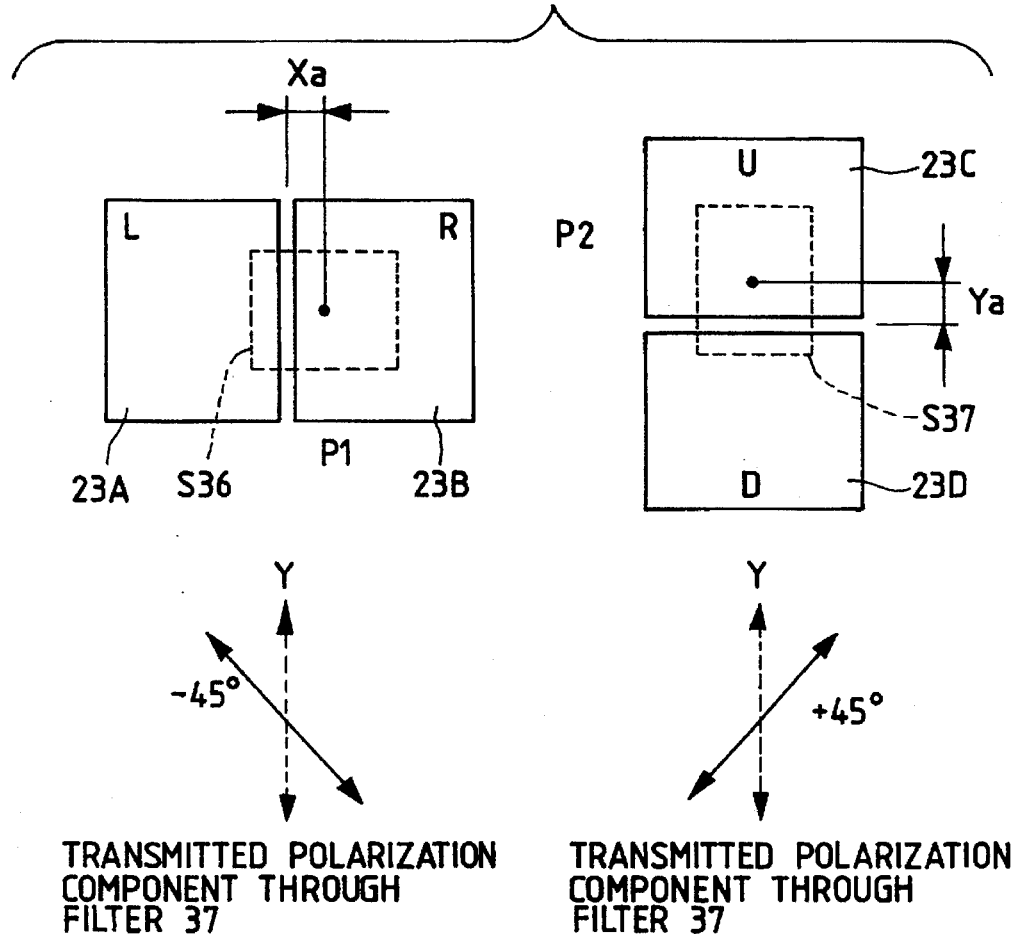
FIG. 10 is an enlarged front view showing a detecting section used in the second embodiment.

Referring now to FIGS. 9 and 10, there is illustrated the second embodiment of the present invention.

In this embodiment, a light emitting section 30 and a detecting section 35 constitute a space coordinates detecting device. In the same input apparatus as that shown in FIG. 1, the light emitting section 30 is provided on the apparatus body 10 side, while the detecting section 35 is provided on the operating member 12 side.

In the light emitting section, a single point light source 31, e.g. infrared-emitting diode, is provided, and in front of the light source 31 is disposed a polarizing plate 32. Infrared light which has been emitted from the point light source 31 and passed through the polarizing plate 32 substantially contains only a linear polarization component whose polarization direction corresponds to the y direction with respect to fixed coordinates (x-y coordinates) on the light emitting section 30 side. As to the light source 31, there may be used plural such light sources.

In the detecting section 35 there are provided filters 36 and 37 which transmit polarization components of −45° and +45° on opposite sides to each other with respect to the Y axis. The light which has passed through the filter 36 is received and detected by bisected light sensing portions 23A and 23B divided in the Y axis direction, while the light which has passed through the filter 37 is received and detected by bisected light sensing portions 23C and 23D divided in the X axis direction.

The detecting section 35 is mounted in the operating member 12, and consideration is here given to the case where the operating member 12 rotates by an angle α around Z axis which is a perpendicular extending from the detecting section 35. The filters 36 and 37 transmit polarization components of 45° in directions reverse to each other, so with respect to the detection outputs received by the bisected light sensing portions after passing through those filters, the quantity of received light increases on the side where the filter transmitting polarization angle approaches the linearly polarized light emitted from the light emitting section 30, while on the side where the said polarization angle goes away from such linearly polarized light, the quantity of received light decreases.

It is necessary that a square light spot S36 formed in the bisected light sensing portions 23A and 23B after passing through the filter 36 and a square light spot S37 formed in the bisected light sensing portions 23C and 23D after passing through the filter 37, (for the light spots S36 and S37, see FIG. 10), should have an equal area and should not deviate from the light sensing areas of those bisected light sensing portions.

When the polarization direction of the polarizing plate 32 in the light emitting section 30 and that of the filter 36 or 37 are in complete coincident with each other, the sum of the outputs detected by the bisected light sensing portions 23A and 23B or the sum of the outputs detected by the bisected light sensing portions 23C and 23D is assumed to be P0. Further, when the detecting section 35 has rotated by an angle of +α (unit: degree) relative to the Z axis, the sum of the outputs detected by the bisected light sensing portions 23A and 23B and that of the outputs detected by the bisected light sensing portions 23C and 23D are assumed to be P1 and P2, respectively. The relation of P1 and P2 to P0 is as represented by the following Expression 10:

$$P_1 = P_0 \{1 - \sin(\alpha - 45)\}$$

$$P_2 = P_0 \{1 - \sin(\alpha + 45)\} \quad \text{(Expression 10)}$$

If the differences (P2−P1) and (P1−P2) between the detected outputs in the right and left bisected light sensing portions are calculated, there are obtained such results as represented by the following Expression 11:

(Expression 11)
$$\begin{aligned}
P_2 - P_1 &= P_0\{1 - \sin(\alpha + 45)\} - P_0(1 - \sin(\alpha - 45)) \\
&= -\sqrt{2}\, P_0 \cos\alpha \\
P_1 - P_2 &= P_0\{1 - \sin(\alpha - 45)\} - P_0(1 - \sin(\alpha + 45)) \\
&= \sqrt{2}\, P_0 \sin\alpha
\end{aligned}$$

If P=(P1−P2)/(P2−P1), P is as follows:

$$P = (P_1 - P_2)/(P_2 - P_1) = -\tan\alpha \quad \text{(Expression 12)}$$

From Expression 12 α is obtained as follows:

$$\alpha = -\tan^{-1} P \quad \text{(Expression 13)}$$

Thus, from the sum P1 of the outputs detected by the bisected light sensing portions 23A, 23B and the sum P2 of the outputs detected by the bisected light sensing portions 23C, 23D there can be obtained a relative rotation angle α of the detecting section 35 and light emitting section 30 with respect to the Z axis by performing the arithmetic operations of Expressions 11, 12 and 13.

Further, central positions Xa and Ya of the square light spots S36 and S37 in FIG. 10 can be calculated by performing the arithmetic operation of Expression 14 for the detected outputs L, R in the light sensing portions 23A, 23B and for the detected outputs U, D in the light sensing portions 23C, 23D. By performing the same arithmetic operation as that of Expression 6 for the Xa and Ya it is possible to calculate inclination angles θx and θy (see FIG. 1) of the detecting section 35 relative to the light emitting section 30 side of the Z axis.

$$Xa = (R - L)/(R + L)$$

$$Ya = (U - D)/(U + D) \quad \text{(Expression 14)}$$

In this case, θx and θy can be calculated in an approximate manner by only the arithmetic operations of Expressions 14 and 6, but since the detecting section 35 is mounted in the operating member 12 and its X-Y orthogonal coordinates are in a rotated state by the angle α relative to the Z axis, both θx and θy can be calculated more accurately by making correction at the angle α.

In place of the bisected light sensing portions 23A and 23B there may be used a PSD element capable of detecting the position of the square light spot S36 in the X axis direction, and instead of the bisected light sensing portions 23C and 23D there may be used a PSD element capable of detecting the position of the square light spot S37 in the Y axis direction.

Referring now to FIGS. 11A and 11B, there is illustrated a circuit configuration which is used in the space coordinates detecting device of each of the above embodiments.

In the first embodiment illustrated in FIGS. 1 and 2, infrared lights which are 180° out of phase with each other are emitted intermittently at the same frequency from the point light sources 16 and 17. Also in the second embodiment illustrated in FIG. 9, infrared light is emitted intermittently at a predetermined frequency from the point light source 31. Therefore, in the divided light sensing portions 23a to 23d or 23A to 23D in each of the above embodiments there are detected outputs substantially exhibiting a sine curve change corresponding to the above pulse period.

As shown in FIG. 11, a current-to-voltage converter 41 is connected to each of the divided light sensing portions, whereby the current value of the detected output in each light sensing portion is converted to a voltage value. Each output voltage passes through a band-pass filter 42, whereby the frequency component of pulsative light emission (intermittent light emission) is removed. Then, each detected voltage is amplified by an amplifier 43, followed by detection in a detector 44, so that a voltage proportional to the quantity of light received by each light sensing portion is taken out as DC component. Further, the voltage outputs from the detectors 44 are added as voltage values by means of an adder 45 and the result is provided to an auto gain control circuit 46, which in turn controls the amplification factor of the amplifiers 43.

The detection voltage from each detector 44 is converted to a digital value by means of an analog-to-digital converter 47 for example and the operations of sum, difference, quotient and product are performed by means of a digital operation unit 48. That is, the arithmetic operations of Expressions 1 to 14 are conducted by the digital operation unit 48. Thus, the digital operation unit 48 corresponds to the computing section in the present invention.

In the case where the circuit shown in FIG. 11 is provided within the operating member 12 shown in FIG. 1, the outputs after the computation is transmitted to the apparatus body 10 side by infrared ray transmission or FM transmission or wire connection. On the apparatus body 10 side, a cursor mark or the like is displayed on the screen 11 in accordance with the information received.

Alternatively, there may be adopted a construction wherein the information relating to current outputs from the divided light sensing portions or relating to the voltage outputs after current-to-voltage conversion are transmitted to the apparatus body 10 by wire or wireless and wherein the circuits after the band-pass filters 42 are disposed on the apparatus body 10 side.

Further, in such an input apparatus as shown in FIG. 1, the light emitting section and the detecting section in each of the above embodiments may be disposed on the operating member 12 side and the apparatus body 10 side, respectively.

For example, in the case where the detecting section 20 shown in FIG. 3 is provided on the apparatus body 10 side and the two point light sources 16 and 17 are provided on the operating member 12 side, the X-Y coordinates serving as the basis of the quartered light sensing portions shown in FIG. 3 are fixed in space. Therefore, the Z axis inclination angles θx and θy can be calculated on the basis of the arithmetic operations of Expressions 3 and 5 even without performing the operation of Expression 4 using the rotatory coordinates of Xα–Yα. In this case, the rotational angle α relative to the Z axis can be detected by the operation of Expression 1 or 2 and the information thereof can be obtained in the apparatus body 10. Moreover, θx and θy can be determined by only arithmetic operations similar to those of Expressions 3 and 5 and further Expression 6.

The space coordinates detecting device of the present invention is applicable not only to such an input apparatus having the operating member 12 as shown in FIG. 1 but also to the detection of position and angle in virtual reality.

The third embodiment of the present invention will be described below with reference to the drawings.

Figure 12:
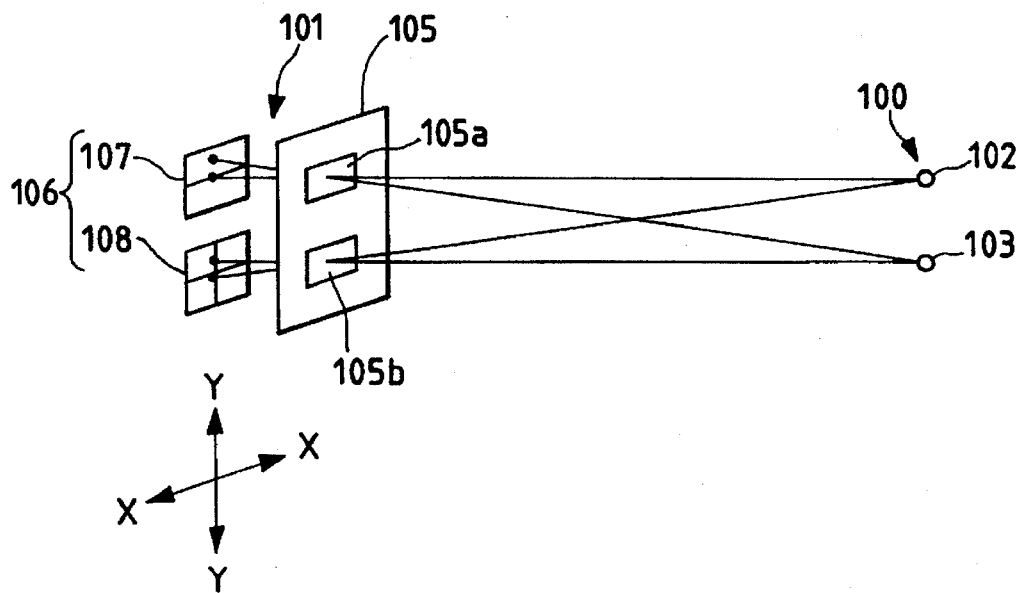
FIG. 12 is a perspective view showing a basic structure of a space coordinates detecting device according to the third embodiment of the present invention.
Figure 13:
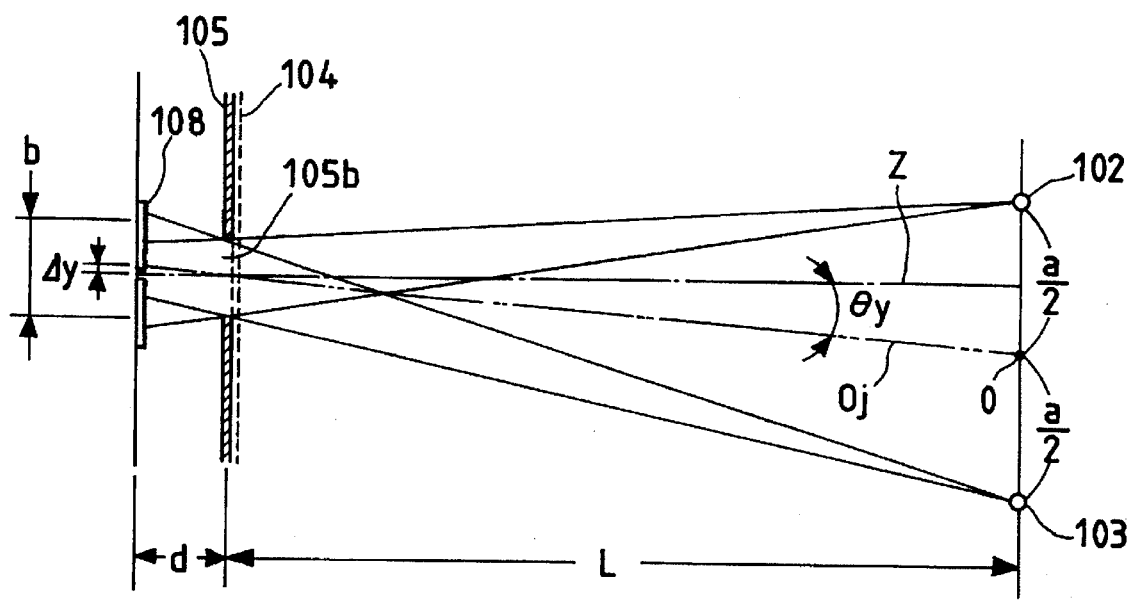
FIG. 13 is a sectional view showing an optical system used in the space coordinates detecting device of the third embodiment.
Figure 14:
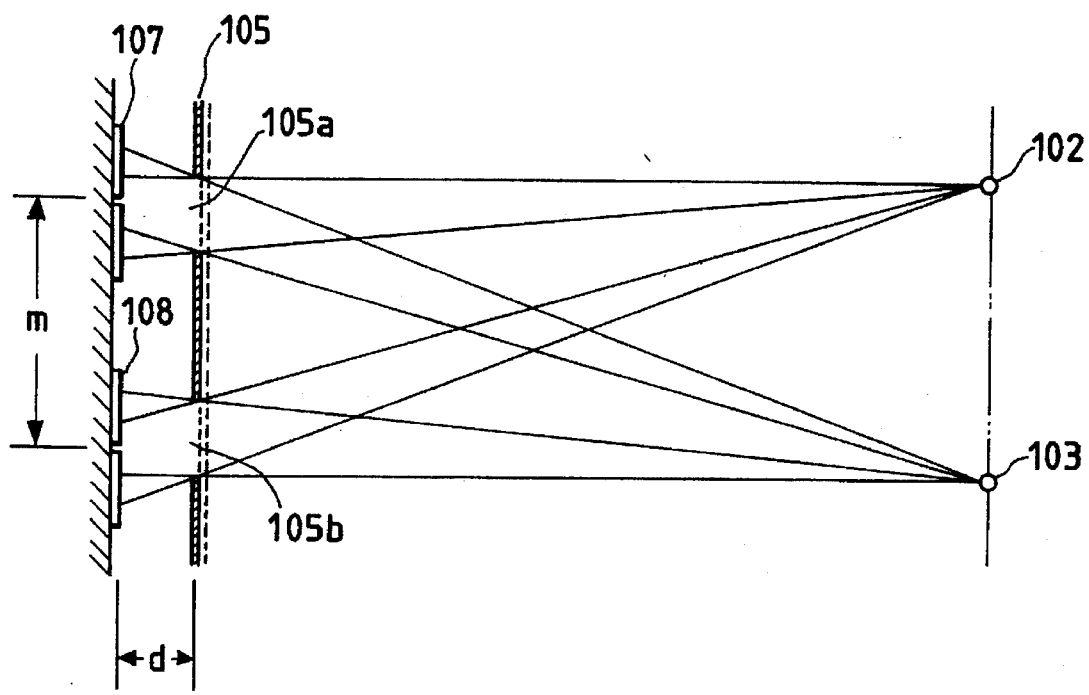
FIG. 14 is a sectional view showing another optical system used therein.
Figure 15:
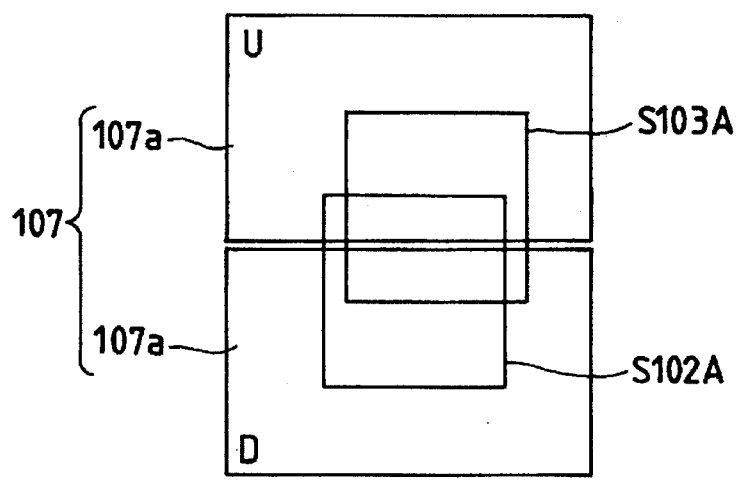
FIG. 15 is a plan view of a first light sensing element used therein.
Figure 16:
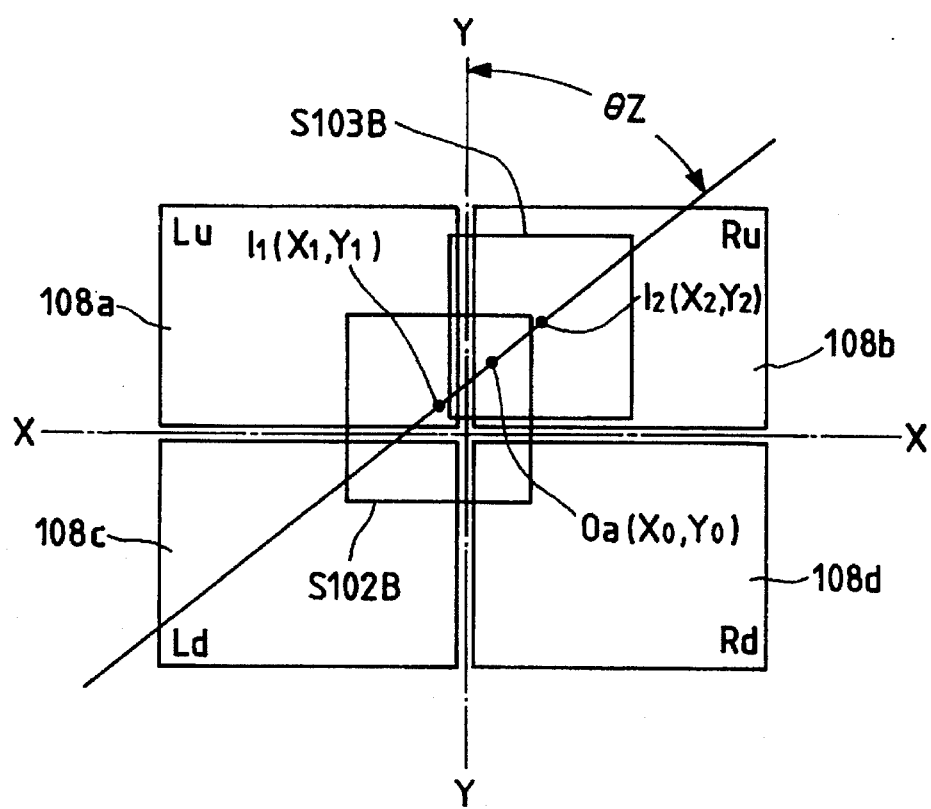
FIG. 16 is a plan view of a second light sensing element used therein.
Figure 17:
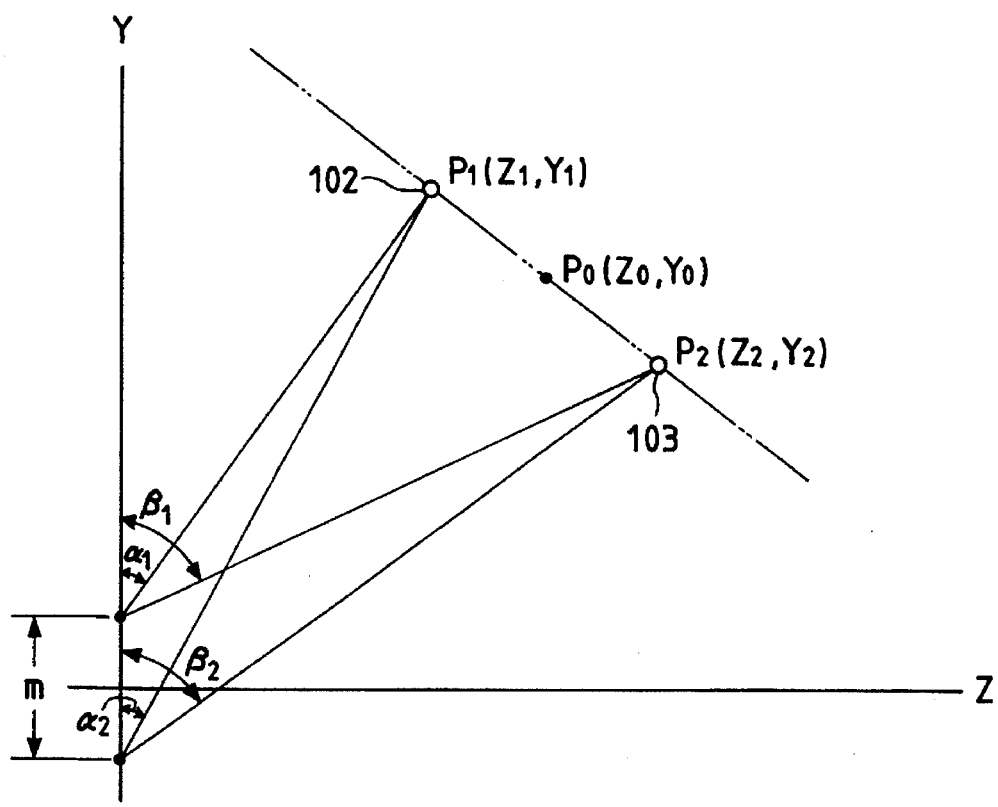
FIG. 17 is an explanatory view schematically showing the optical system of FIG. 14.

FIG. 12 is a perspective view showing a basic structure of a space coordinates detecting device according to the third embodiment of the present invention, FIG. 13 is a sectional view showing one optical system provided in the space coordinates detecting device, FIG. 14 is a sectional view showing another optical system provided in the space coordinates detecting device, FIG. 15 is a plan view of a first light sensing element provided in the space coordinates detecting device, FIG. 16 is a plan view of a second light sensing element provided in the space coordinates detecting device, and FIG. 17 is an explanatory view showing the optical system of FIG. 14 schematically.

In the space coordinates detecting device of this embodiment, a light emitting section 100 has two light sources 102 and 103 which emit lights distinguishable from each other and which are arranged through a predetermined spacing. For example, the light sources 102 and 103 are each constituted by an infrared-emitting diode, and modulated lights which have the same frequency (period) and which are 180° out of phase with each other, are outputted from both light sources. If a horizontal axis passing through the center O of the light emitting section 100 is X axis and a vertical axis passing through the center O is Y axis, the light sources 102 and 103 are each located in a position spaced a distance of a/2 from the center O on the Y axis (see FIGS. 13 and 14). The detecting section 100 comprises a visible light cut-off filter 104, a throttle plate 105 and a light sensing element group 106. As shown in FIGS. 13 and 14, the visible light cut-off filter 104, throttle plate 105 and light sensing element group 106 are arranged in this order successively from both light sources 102 and 103 side and in parallel with one another, provided FIG. 12 omits the visible light cut-off filter 104.

The axis perpendicular to the light-sensitive surfaces of the light sensing element group 106 is used as z axis and X-Y orthogonal coordinates orthogonal to the Z axis in the detecting section 101 are set. In this state, first and second rectangular apertures 105a, 105b are formed in the throttle plate 105 through a predetermined spacing in the Y axis direction. On the other hand, the light sensing element group 106 is composed of first and second light sensing elements 107 and 108 which are opposed to the throttle apertures 105a and 105b, respectively. For example, the light sensing elements 107 and 108 are each constituted by a pin photodiode. As shown in FIG. 15, the first light sensing element 107 opposed to the upper throttle aperture 105a has light sensing portions 107a and 107b divided in the Y axis direction. On the other hand, as shown in FIG. 16, the second light sensing element 108 opposed to the lower throttle aperture 105b has quartered light sensing portions 108a, 108b, 108c and 108d. The set of 108a, 108b and the set of 108c, 108d are divided in the Y axis direction, while the set of 108a, 108c and the set of 108b, 108d are divided in the X axis direction.

Infrared lights emitted at different timings (periods) from the light sources 102 and 103 pass through the visible light cut-off filter 104, then are throttled by the throttle apertures 105a and 105b of the throttle plate 105 and are radiated as square light spots onto the light-sensitive surfaces of the first and second light sensing elements 107 and 108. At this time, since the visible light cut-off filter 104 is provided, extraneous noise components other than the square infrared light spots are cut off as much as possible in the light sensing element group 106. In FIG. 15, the infrared light spot from the light source 102 and that from the light source 103 are indicated at S102A and S103A, respectively. In FIG. 16, the infrared light spot from the light source 102 and that from the light source 103 are indicated at S102B and S103B, respectively.

In each of the divided light sensing portions of the first and second light sensing elements 107 and 108 there is obtained a detection current resulting from photoelectric conversion on the basis of the light spot irradiation area and irradiation light intensity. This detection current is then converted to a voltage and subjected to an arithmetic processing, although the processing circuit will be described later. The detection outputs based on the irradiation areas of light spots S102A and S103A in the divided light sensing portions 107a and 107b of the first light sensing element 107 are indicated at U and D in FIG. 15, while the detection outputs based on the irradiation areas of light spots S102B and S103B in the divided light sensing portions 108a to 108d of the second light sensing element 108 are indicated at Lu, Ru, Ld and Rd in FIG. 16. As mentioned above, since infrared lights are emitted at different timings from the light sources 102 and 103, the detection timing of light spot S102A and that of light spot S103A in the first light sensing element 107 are different and the aforesaid detection outputs U and D are obtained for the light spots S102A and S103A, respectively, by making time-division in the processing circuit. Likewise, the above detection outputs Lu, Ru, Ld and Rd are obtained for the light spots S102B and S103B which are applied to the second light sensing element 108.

The space coordinates detecting device thus constructed can functionally be separated into such two optical systems as shown in FIGS. 13 and 14. The following description is now provided about the detection principle in each of the optical systems.

The optical system shown in FIG. 13 will first be explained. The infrared lights emitted at different timings from both light sources 102 and 103 are throttled by the throttle aperture 105b and then radiated as light spots S102B and S103B to the divided light sensing portions 108a –108d of the second light sensing element 108, as shown in FIG. 16. In the same figure, if central coordinates of the light spot S102B from the light source 102 on the X-Y orthogonal coordinates on the detecting section 101 side are I1 (X1, Y1), central coordinates of the light spot S103B from the light source 103 are I2 (X2, Y2 ), and coordinates of the point of intersection between a straight line Oj and the light-sensitive surface of the second light sensing element 108 are Oa (Xo, Yo), the straight line Oj connecting the center O of the light emitting section 100 with the center of the throttle aperture 105b , then Oa is positioned intermediate between I1 and I2. The detection state of FIG. 16 represents a relatively rotated state by an angle of θz of the Y axis of X-Y orthogonal coordinates on the light emitting section 100 side where the light sources 102 and 103 are disposed, with respect to the Y axis on the detecting section 101 side. In this case, the rotational angle αz about Z axis is equal to the inclination of a straight line passing through I1 and I2, and:

$$\tan \theta z = (X_2 - X_1)/(Y_2 - Y_1)$$

Therefore, $$\theta z = \tan^{-1}[(X_2 - X_1)/(Y_2 - Y_1)] \quad (1)$$

In the above expression (1), X1 and X2 are determined from the difference between the quantity of light received by the set of light sensing portions 108b, 108d and that received by the set of light sensing portions 108a, 108c, which are divided in the X axis direction, with respect to the light spots S102B and S103B. Likewise, Y1 and Y2 are determined from the difference between the quantity of light received by the set of light sensing portions 108a, 108b and that received by the set of light sensing portions 108c, 108d , which are divided in the Y axis direction, with respect to the light spots S102B and S103B. That is, the detected outputs Lu, Ru, Ld and Rd in the divided light sensing portions 108a –108d and the coordinates X1, X2, Y1 and Y2 are in a proportional relation and can be represented as follows:

$$X1, X2 \propto [(Ru+Rd)-(Lu+Ld)]/(Ru+Lu+Rd+Ld)$$

$$Y1, Y2 \propto [(Ru+Lu)-(Rd+Ld)]/(Ru+Lu+Rd+Ld) \quad (2)$$

Thus, by performing the arithmetic operation of the above expression (2) for the detected outputs Lu, Ru, Ld and Rd provided from the divided light sensing portions 108a–108d of the second light sensing element 108 and by further performing the calculation of the above expression (1), it is possible to determine a relative rotation angle θz of the detecting section 101 with respect to the Z axis.

In FIG. 13, if the X and Y direction components of the inclination angle between the foregoing straight line Oj and the Z axis are θx (radian) and θy (radian), respectively, deviations in X and Y axis directions of coordinates Oa (Xo, Yo) based on the X-Y orthogonal coordinates on the light emitting section 100 side are Δx and Δy, respectively, and the distance from the throttle plate 105 to the light-sensitive surfaces of the light sensing element group 106 is d, then since d is delicate, $$\Delta x = d \cdot \tan \theta x = d \cdot x \Delta y = d \cdot \tan \theta y = d \cdot \theta y$$

Thus, $$\theta x = \Delta x/d \, \theta y = \Delta y/d \quad (3)$$

In the detection state of FIG. 16, the detecting section 101 is in a rotated state by the angle θz relative to the Z axis, so the X-Y orthogonal coordinates on the detecting section 101 side are in a θz rotated state relative to the X-Y orthogonal coordinates (fixed in space) on the light emitting section 100 side. In FIG. 16, therefore, if rotatory coordinates corresponding to the rotation by the angle θz relative to the X-Y orthogonal coordinates fixed on the detecting section 101 side are set, then θx and θy on the said rotatory coordinates area $$\Delta x = X_o \cos \theta z + Y_o \sin \theta z$$

$$\Delta y = -X_o \sin \theta z + Y_o \cos \theta z \quad (4)$$

Further, Xo and Yo are determined as $$X_o = (X_1 + X_2)/2 \, Y_o = (Y_1 + Y_2)/2 \quad (5)$$

In the above expressions (3) to (5), d is known, so by calculating X1, X2, Y1 and Y2 from the outputs Lu, Ru, Ld and Rd detected in the divided light sensing portions 108a–108d of the second light sensing element 108 in accordance with the above expression ② and by performing the calculations of the expressions ③ to ⑤ on the basis of the results of the calculation, it is possible to determine the inclinations θx and θy of the Z axis relative to the X-Y orthogonal coordinates on the light emitting section 100 side.

In FIG. 13, moreover, if the distance in the Z axis direction between the light emitting section 100 and the detecting section 101 is L and the distance between I1 and I2 at the light-sensitive surface of the second light sensing element 108 is b, the relation of these L and b to the foregoing a (distance between both light sources 102 and 103) and d (distance between the throttle plate 105 and the light-sensitive surfaces of the light sensing element group 106) is as follows:

$$L/d = a/b$$

Thus, $$L = a \cdot d/b \qquad ⑥$$

In the above expression ⑥, a and d are known and b can be expressed as follows from the positions of I1 (X1, Y1) and I2 (X2, Y2) on the X-Y orthogonal coordinates on detecting section 101 side:

$$b = \sqrt{[(X_1-X_2)^2 + (Y_1-Y_2)^2]} \qquad ⑦$$

Accordingly, by calculating X1, X2, Y1 and Y2 from the outputs Lu, Ru, Ld and Rd detected in the divided light sensing portions 108a–108d of the second light sensing element 106 in accordance with the expression ②, the distance b can be determined on the basis of the results of the calculation and in accordance with the expression ⑦ and further it is possible to determine the distance L in accordance with the expression ⑥. When the distance L changes from L1 to L2, the resulting displacement ΔL can be determined as follows:

$$\Delta L = L_2 - L_1$$

Description is now directed to the optical system of FIG. 14. The infrared lights emitted at different timings from both light sources 102 and 103 are throttled by the throttle apertures 105a and 105b, then radiated as light spots S102A and S103A to the divided light sensing portions 107a and 107b of the first light sensing element 107 and also radiated as light spots S102B and S103B to the divided light sensing portions 108a–108d of the second light sensing element 108. FIG. 17 schematically shows the optical system of FIG. 14 with the detecting section 17 being in a certain posture. For convenience's sake, Z-Y orthogonal coordinates are set on the detecting section 101 side.

In FIG. 17, if the coordinates of the light source 102 on the Z-Y orthogonal coordinates on the detecting section 101 side are P1 (Z1, Y1), the coordinates of the light source 103 are P2 (Z2, Y2), the spacing in the Y axis direction between the first and second light sensing elements 107, 108 is m, and the angles between the optical axes of the infrared lights emitted from both light sources 102 and 103 and the Y axis are α1, α2, β1, β2, then α1, α2, β1, β2 are determined from the light spots S102A, S102B, S103A and S103B, respectively. That is, a displacement θy between the light spots S102A and S103A on the first light sensing element 107 shown in FIG. 15 is expressed as follows:

$$\Delta y \propto (U-D)/(U+D)$$

Therefore, the angles α1 and β1, can be determined by substituting the outputs U and D detected in both divided light sensing portions 107a and 107b of the first light sensing element 107 and the known value d into the expressions α1=Δy/d and β1=Δy/d. Further, a displacement Δy between the light spots S102B and S103B on the second light receiving element 108 shown in FIG. 16 is expressed as follows:

$$\Delta y \propto [(Ru+Lu)-(Rd+Ld)]/(Ru+Lu+Rd+Ld)$$

Therefore, the angles α2 and β2 can be determined by substituting the outputs Lu, Ru, Ld and Rd detected in the divided light sensing portions 108a–108d of the second light sensing element 108 and the known value d into the expressions α2=Δy/d and β2=Δy/d. Once α1, α2, β1 and β2 are determined in this way, the coordinates of P1 (Z1, Y1) are determined from the known value of m and the values of α1 and β2 in accordance with the principle of trigonometrical measurement, and in the same way there are obtained the coordinates of P2 (Z2, Y2) from the values of m, β1 and β2.

Once the coordinates of P1 and P2 are determined in the above manner, there are determined a relative angle θy between the light emitting section 100 and the detecting section 101, a relative displacement Q in the Y axis direction between both sections 100 and 101, and a relative displacement L in the Z axis direction of both sections. First, θy is equal to the inclination of a straight line passing through P1 and P2 and since $$\tan \theta y = (Y_1 Y_2)/(Z_1-Z_2)$$

θy can be expressed as $$\theta y = \tan^{-1}[(Y_1 Y_2)/(Z_1 Z_2)] \qquad ⑧$$

Therefore, by substituting the values of Z1, Z2, Y1, and Y2 which have been calculated from the outputs U and D detected by the first light sensing element 107 and the outputs Lu, Ru, Ld and Rd detected by the second light sensing element 108 into the above expression ⑧, there is determined a relative angle θy between the light emitting section 100 and the detecting section 101.

Given that the coordinates of a middle point between P1 and P2 are Po (Zo, Yo), Zo and Yo can be expressed as follows:

$$Z_o = (Z_1+Z_2)/2, Y_o = (Y_1 Y_2)/2$$

Accordingly, transformation into a rotatory coordinate system gives the values of Q and L as follows:

$$Q = -Z_o \sin \theta y + Y_o \cos \theta y$$

$$L = Z_o \cos \theta y + Y_o \sin \theta y \qquad ⑨$$

By substituting the foregoing Zo and Yo which have been calculated from Z1, Z2, Y1, Y2 and the value of θy which has been calculated in the above expression ⑤, into the above expression ⑨ there are obtained a relative Y-axis displacement Q between the light emitting section 100 and the detecting section 101 and a relative Z-axis displacement L between both sections 100 and 101.

Figure 18:
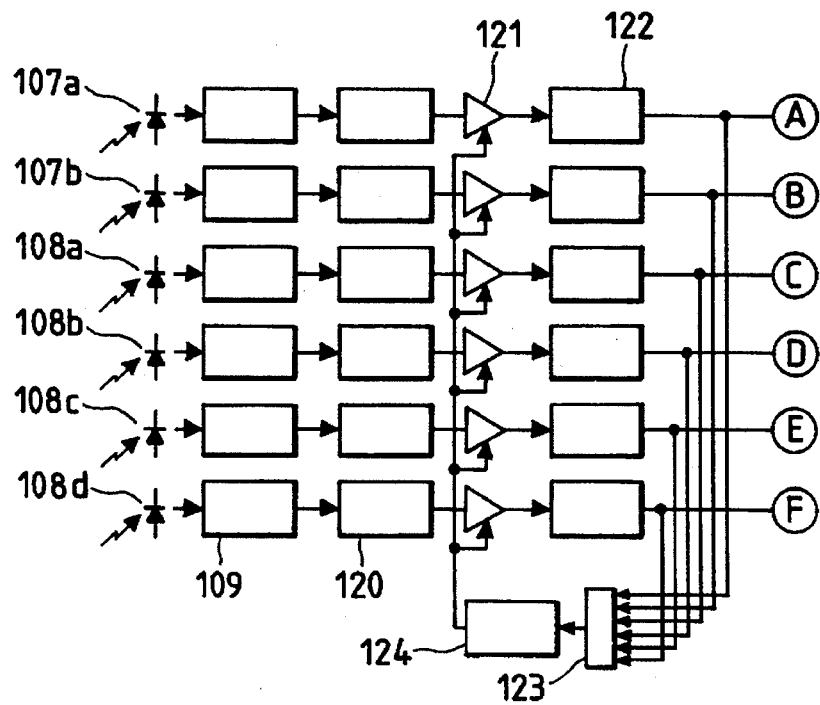
FIG. 18 is a block diagram showing a circuit configuration used in the space coordinates detecting device of the third embodiment.
Figure 19:
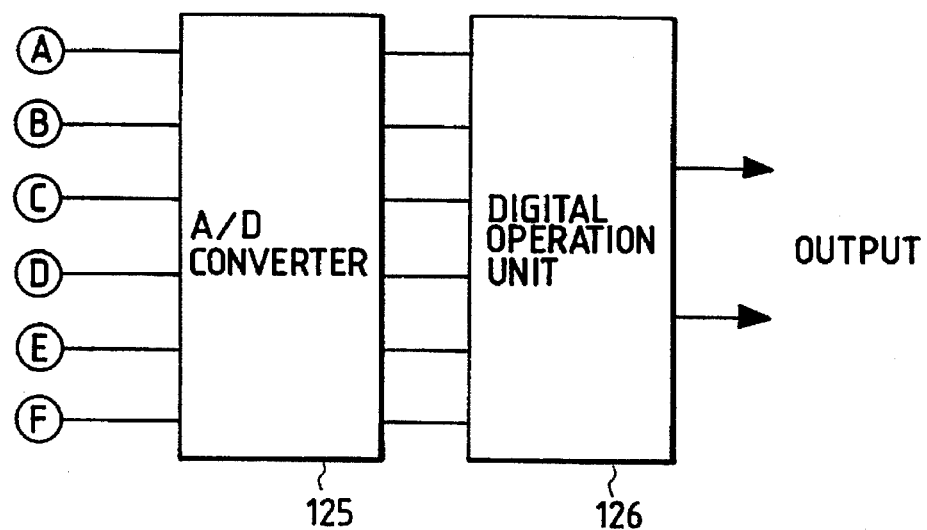
FIG. 19 is a block diagram showing a latter stage of the circuit of FIG. 18.

FIGS. 18 and 19 illustrate a circuit configuration used in the space coordinates detecting device of the above embodiment.

Infrared lights which are 180° out of phase with each other are emitted intermittently at the same frequency from both light sources 102 and 103. Consequently, detected outputs exhibiting a generally sine curve change corresponding to the foregoing pulse period are obtained in the divided light sensing portions 107a and 107b of the first light sensing element 107 or in the divided light sensing portions 108a to 108d of the second light sensing element 108.

As shown in FIG. 18, a current-to-voltage converter 109 is connected to each divided light sensing portion, whereby the current value of the output detected in each divided light sensing portion is converted to a voltage value. Each output voltage passes through a band-pass filter 120, whereby the frequency component of the pulsative (intermittent) light emission is removed. Then, each detection voltage is amplified by means of an amplifier 121, followed by detection in a detector 122, and a voltage proportional to the quantity of light detected by each divided light sensing portion is taken out as DC component. Further, the voltage outputs from the detectors 122 are added as voltage values by means of an adder 123 and the result is fed to an auto gain control circuit 124, which in turn controls the amplification factor of the amplifiers 121.

The detection voltage from each detector 122 is converted to a digital value by means of an analog-to-digital converter 125 such as that shown in FIG. 19 and the operations of sum, difference, quotient and product are performed by means of a digital operation unit 126. That is, the arithmetic operations of the foregoing expressions ① to ⑨ are carried out by the digital operation unit 126, which operation unit 126 corresponds to the operation section in the present invention.

Figure 20:
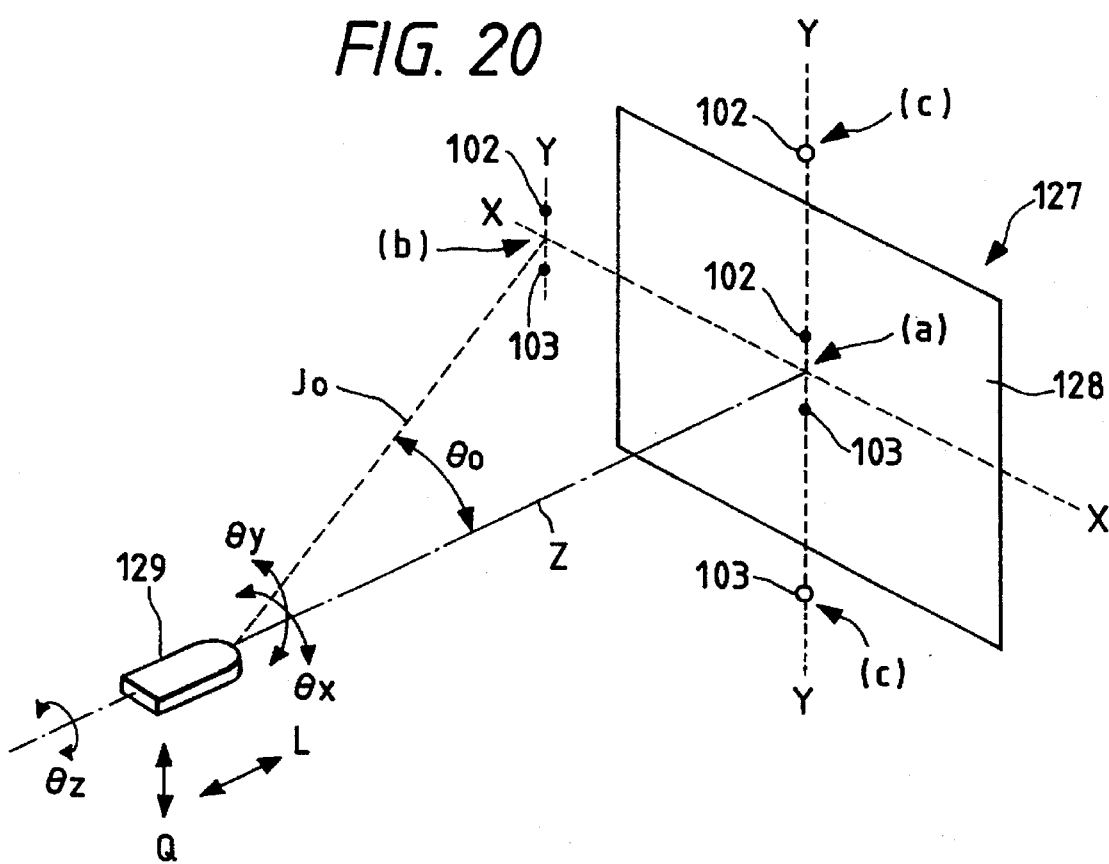
FIG. 20 is a perspective view of an input apparatus using the space coordinates detecting device shown in FIG. 12.

FIG. 20 shows a schematic configuration of an input apparatus using the above space coordinates detecting device. This input apparatus includes an apparatus body 127 on its stationary side. For example, the apparatus body 127 is the body of a computer, an AV apparatus, or a game machine, and has a CRT screen 128. On a moving side thereof is disposed an operating member 129. The operating member 129, which functions as a remote controller, is formed in a size which permits an operator to carry it by hand and move.

The light emitting section 100 is disposed in an arbitrary position of the apparatus body 127, while the detecting section 101 is formed at the front face of the operating member 129. The arithmetic operations of the foregoing expressions ① to ⑨ are performed within the operating member 129 and the results thereof are transmitted to the apparatus body 127 by wire or wireless. Alternatively, only the output detected in the detecting section 101 is transmitted to the apparatus body 127, which in turn performs the above arithmetic operations on the apparatus body 127 side.

In FIG. 20 the center or middle point of both light sources 102 and 103 is shown in the position of the center (a) of the screen 128, but in the actual apparatus the center of both light sources lies in a position outside the screen 128, say, the position indicated at (b). In this case, when the Z axis extending in front of the detecting section 101 is directed to the center of the screen 128, there arises an offset angle $\theta o$ between a line Jo and the Z axis which line Jo connects the center of the detecting section 101 with the center of the light emitting section 100. In this case, by subtracting the offset angle $\theta o$ from a detected angle in the Y direction detected by the detecting section 101, it is possible to determine the direction (opposition angle) $\theta y$ of the Z axis relative to the screen 128. Alternatively, if the center or middle point of both light sources 102 and 103 is positioned centrally of the screen 128 and both light sources 102 and 103 are disposed in upper and lower positions (c) on the Y axis passing through the center and outside the screen, it becomes unnecessary to subtract the offset angle $\theta o$.

According to this input apparatus, even when the operating member 129 rotates by the angle $\theta z$ relative to the Z axis, the inclination angles $\theta x$ and $\theta y$ in the X and Y directions relative to the X-Y coordinates (fixed coordinates in space) on the apparatus body 127 side can be detected taking the rotational angle $\theta z$ into account. Therefore, even if the operating member 129 held by hand is in a rotated state by the angle $\theta z$, it is possible to provide the apparatus body 127 with information relating to the inclinations $\theta x$ and $\theta y$. For example, a cursor mark displayed on the screen 128 can be moved on the X-Y coordinates. That is, by moving the operating member 129 freely in the space it becomes possible to make inputs for instructing image processing on the screen 128 such as, for example, drawing a line or setting the cursor mark to a button indication on the screen and conducting switching operation to change over the picture plane from one to another. In this case, even if the operating member 129 held by hand should rotate relative to the Z axis, it is not likely that this rotation will cause malfunction of the input action for the X-Y coordinates.

In this input apparatus, moreover, the rotational angle $\theta z$ of the operating member 129 relative to the Z axis can be utilized as directive information for the display on the screen 128 of the apparatus body 127. For example, by turning the operating member 129 by the angle $\theta z$, an image which has appeared on the screen 128 can be rotated within the X-Y coordinates on the apparatus body 127 side. This can be utilized in character rotating motion in plotting or in software for a game machine.

Further, in this input apparatus, a relative displacement Q in the Y axis direction between the apparatus body 127 and the operating member 129 can be detected, so it is possible to utilize this displacement Q as directive information for the display on the screen 128 of the apparatus body 127.

Additionally, since information of the distance L up to the operating member 129 can be given to the apparatus body 127 side, it is possible to prevent the operator from feeling a difference in the operation touch between the case where the operating member 129 is close to the screen 128 and the case where it is positioned away from the screen. That is, if the cursor mark is moved on the screen 128 on the basis of only the inclination angles in the $\theta x$ and $\theta y$ directions of the operating member 129, then for example between the case where the operating member 129 is inclined in the $\theta x$ direction in a position close to the screen 128 and the case where the operating member is inclined by the same angle in the $\theta x$ direction in a position spaced sufficiently from the screen, there is no difference in the displacement, or moving distance, of the cursor mark moving on the screen in accordance with information of such inclination angle $\theta x$. Therefore, when the operating member 129 is tilted in a position away from the screen 128, there is created a feeling that the cursor mark does not move so much on the screen. In view of this point, if there is made correction in such a manner that with increase in the distance L between the light emitting section 100 and the detecting section 101, the moving distance of the cursor mark on the screen 128 becomes longer relative to the tilting of the operating member 129 in the $\theta x$ or $\theta y$ direction, while taking into account the distance L which has been calculated in accordance with the foregoing expression ⑥ or ⑨, then it is possible to compensate for the difference in the operation touch between the case where the operating member 129 is close to the screen 128 and the case where it is spaced apart from the screen.

Conversely, when the operating member 129 is spaced fairly long from the screen 128, the above correction may result in that a slight tilt of the operating member causes a large movement of the cursor mark on the screen, leading to error of the operation input due to hand shaking. This can be avoided by making correction reverse to the above in such a manner that when the distance L becomes long, the moving distance of the cursor mark on the screen 128 is kept short relative to inclinations θx and θy of the operating member 129.

Although in the above third embodiment a quartered light sensing element having light sensing portions 108a to 108d divided in the X and Y directions has been used as an example of the second light sensing element 108, light sensing elements divided in two in the X direction and light sensing elements divided in two in the Y direction may be used and disposed extremely close to each other. In this case, the number of throttle apertures increases by one and a total of three such apertures are formed because it is necessary that the light spots from both light sources 102 and 103 be directed to both sets of divided light sensing elements.

The fourth embodiment of the present invention will be described below with reference to the drawings.

Figure 21:
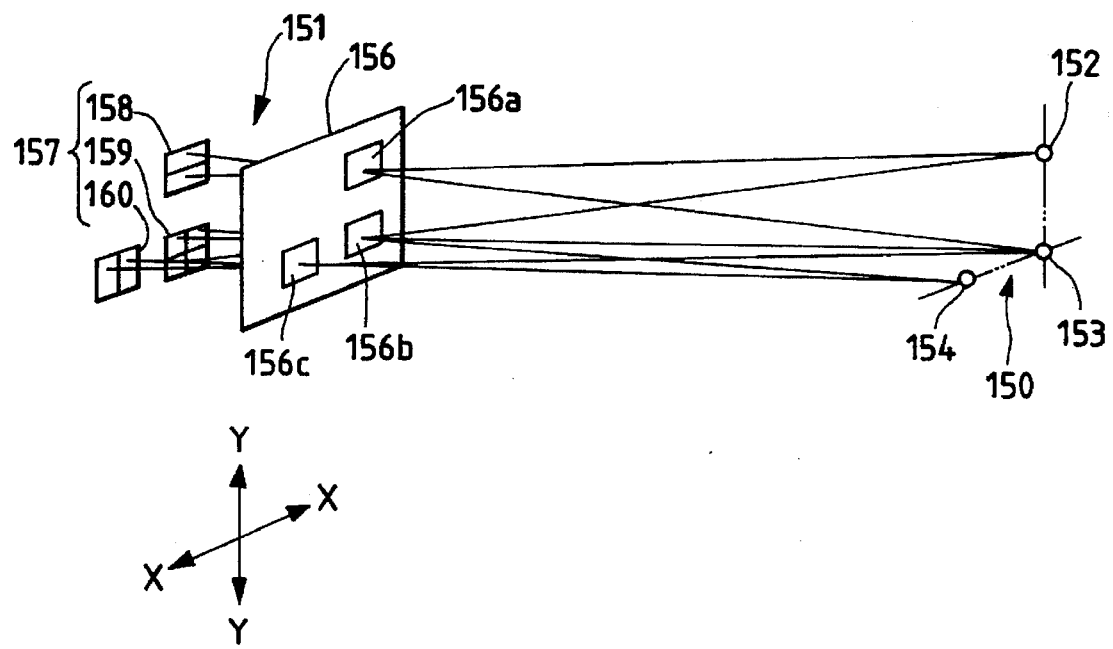
FIG. 21 is a perspective view showing a basic structure of a space coordinates detecting device according to a fourth embodiment of the present invention.
Figure 22:
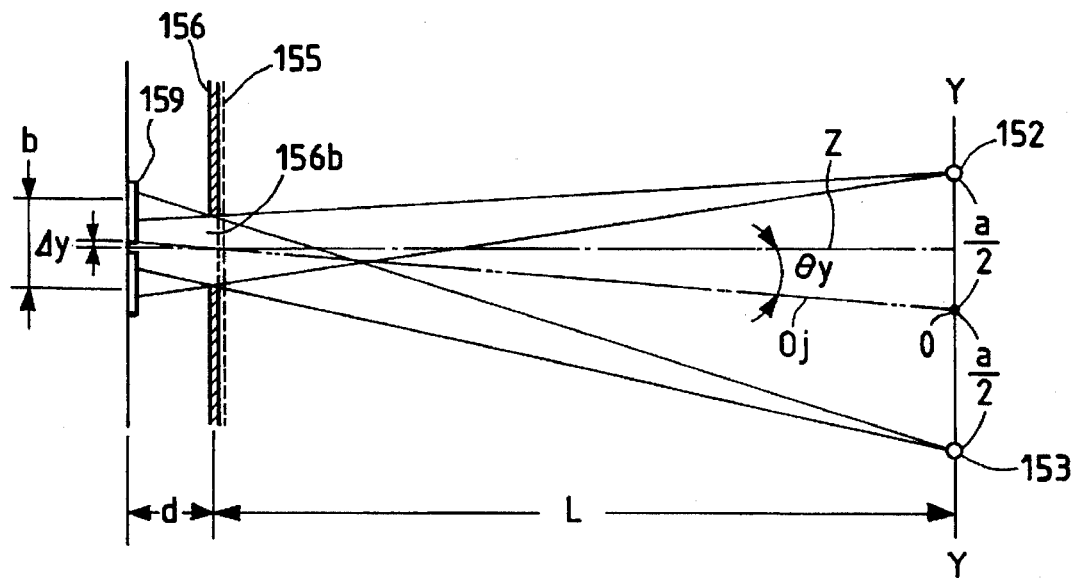
FIG. 22 is a sectional view showing a first optical system used therein.
Figure 23:
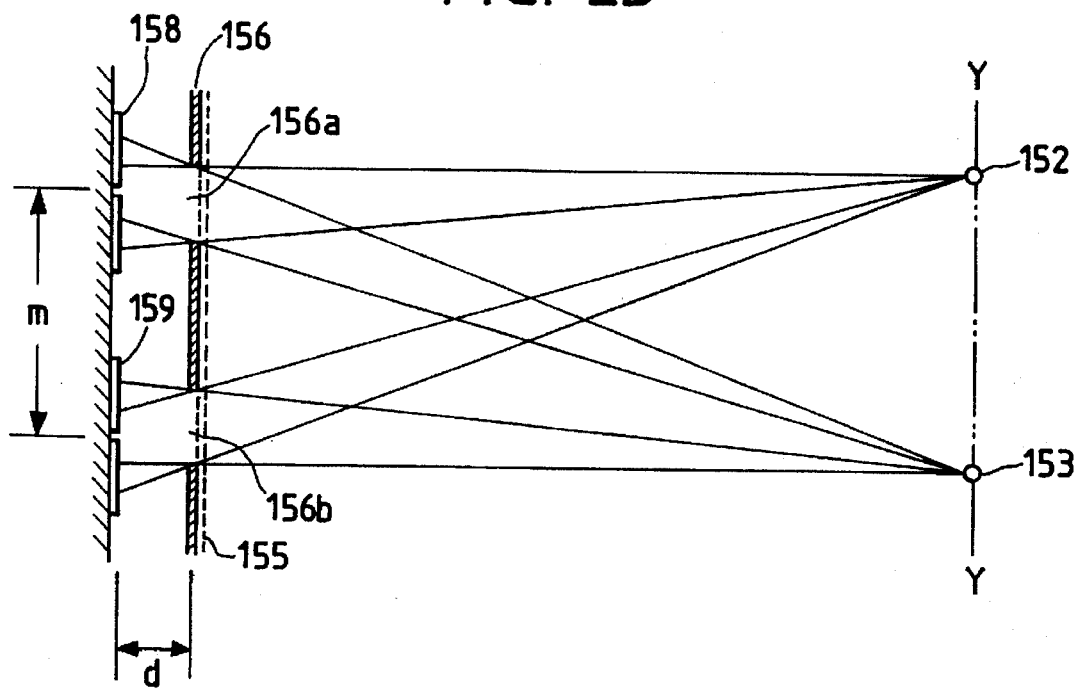
FIG. 23 is a sectional view showing a second optical system used therein.
Figure 24:
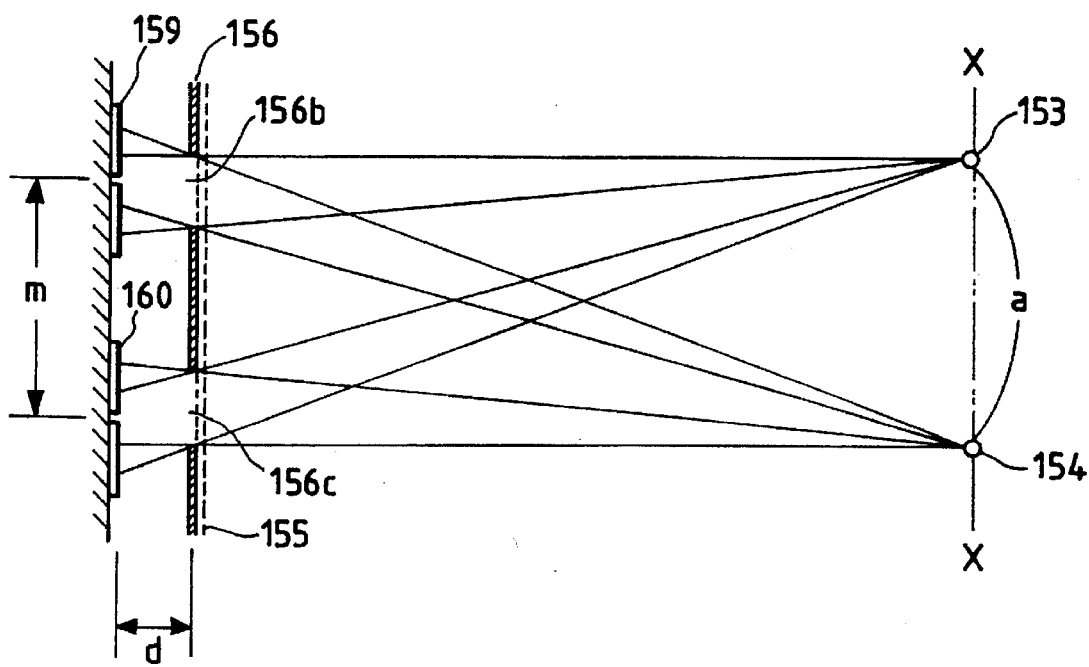
FIG. 24 is a sectional view showing a third optical system used therein.
Figure 25:
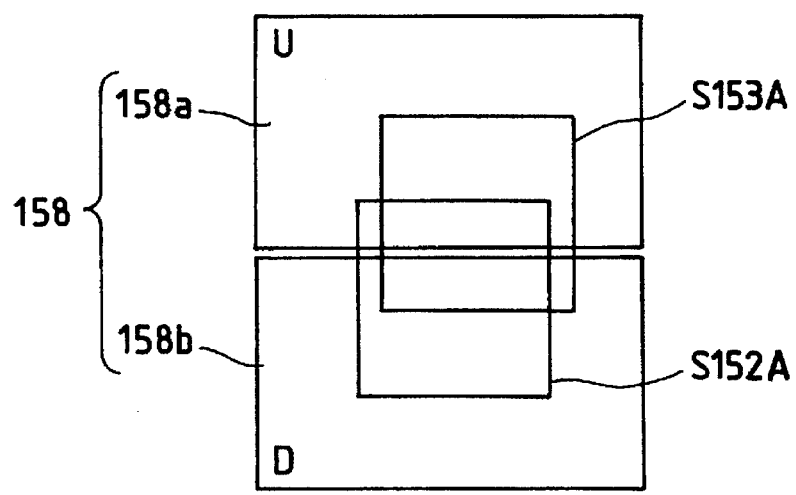
FIG. 25 is a plan view of a first light sensing element used therein.
Figure 26:
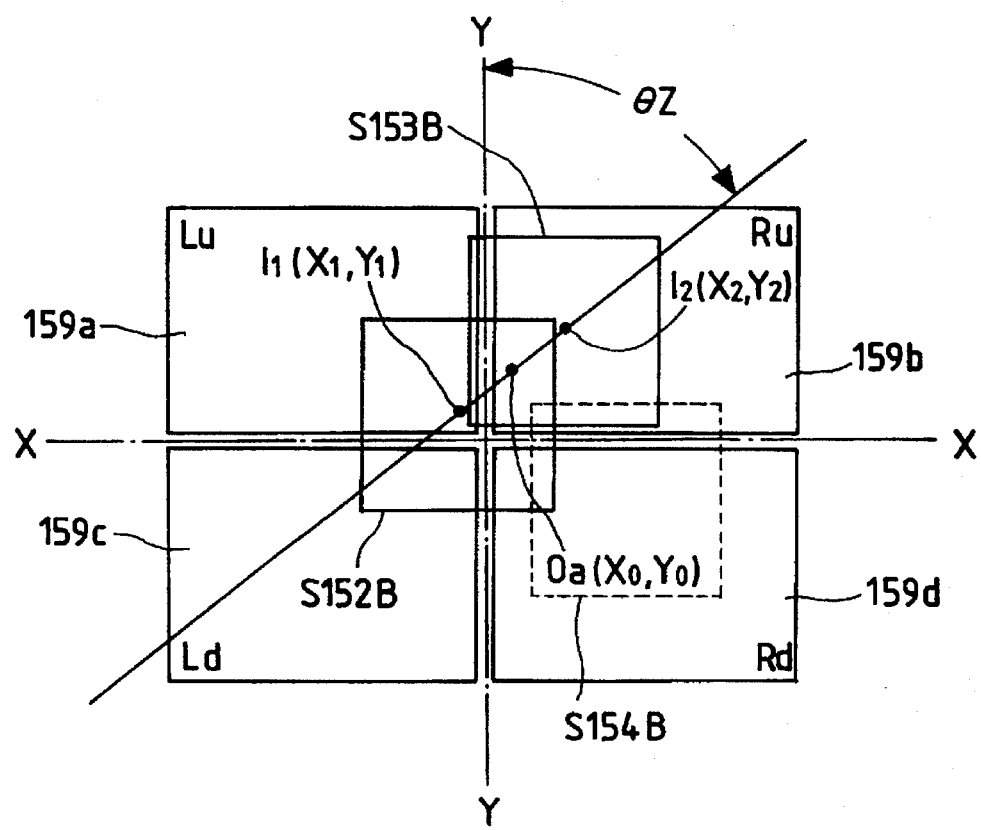
FIG. 26 is a plan view of a second light sensing element used therein.
Figure 27:
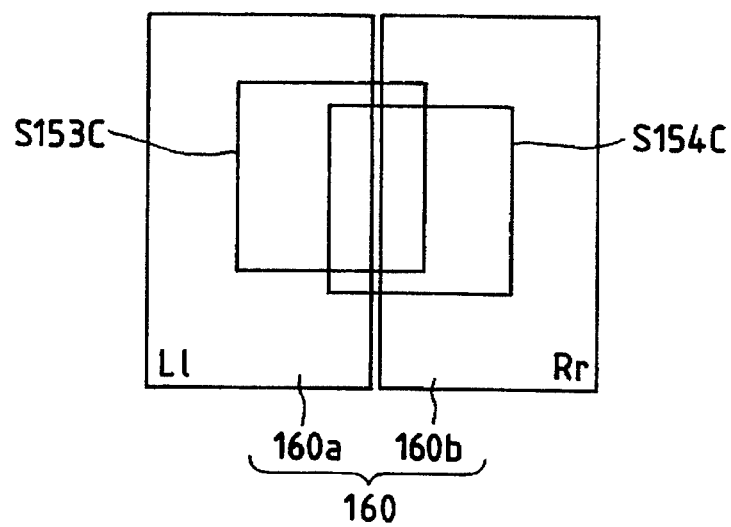
FIG. 27 is a plan view of a third light sensing element used therein.
Figure 28:
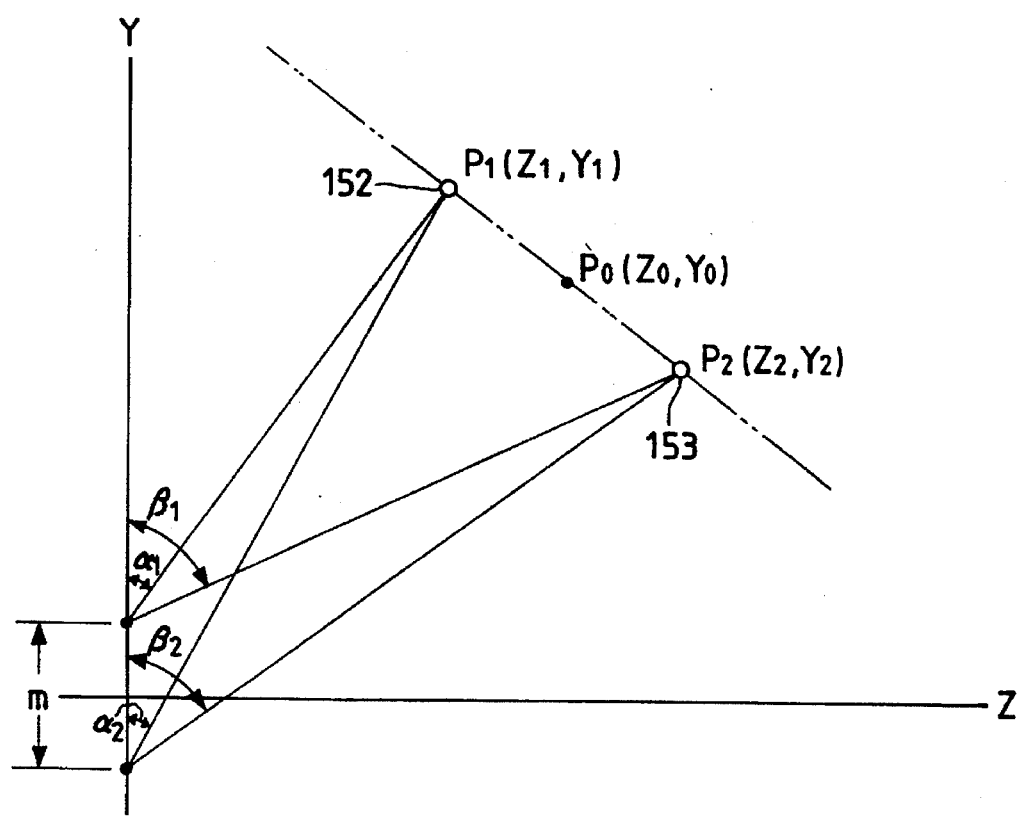
FIG. 28 is an explanatory view showing the optical system of FIG. 23 schematically.

FIG. 21 is a perspective view showing a basic structure of a space coordinates detecting device according to the fourth embodiment of the present invention, FIG. 22 is a sectional view showing a first optical system used in the space coordinates detecting device, FIG. 23 is a sectional view showing a second optical system used in the space coordinates detecting device, FIG. 24 is a sectional view showing a third optical system used in the space coordinates detecting device, FIG. 25 is a plan view of a first light sensing element used in the space coordinates detecting device, FIG. 26 is a plan view of a second light sensing element used in the space coordinates detecting device, FIG. 27 is a plan view of a third light sensing element used in the space coordinates detecting device, and FIG. 28 is an explanatory view showing the optical system of FIG. 23 schematically.

According to this fourth embodiment, a light emitting section 150 has three light sources 152, 153 and 154 which emit lights distinguishable from one another and which are arranged at predetermined spacings. A straight line connecting the first and second light sources 152, 153 is orthogonal to a straight line connecting the second and third light sources 153, 154. The light sources 152, 153 and 154 are each constituted by an infrared-emitting diode for example and they output modulated lights having the same frequency (period) and which are 180° out of phase with one another. If a horizontal axis passing through the second light source 153 is assumed to be X axis and a vertical axis passing through the second light source 153 is assumed to be Y axis, the first and second light sources 152, 153 are spaced a distance a in the Y axis direction, and the second and third light sources 153, 154 are spaced a distance a in the X axis direction, provided these distances are not always required to be the same. A detecting section 151 comprises a visible light cut-off filter 155, a throttle plate 156 and a light sensing element group 157. As shown in FIGS. 22 to 24, the visible light cut-off filter 155, throttle plate 156 and light sensing element group 157 are arranged in this order successively from the light emitting section 150 side and in parallel with one another, provided the visible light cut-off filter 155 is omitted in FIG. 21.

An axis perpendicular to the light-sensitive surfaces of the light sensing element group 157 is assumed to be Z axis and X-Y orthogonal coordinates orthogonal to the Z axis are set in the detecting section 151. In this state, three square apertures 156a, 156b and 156c are formed in the throttle plate 156 at predetermined spacings. The first and second throttle apertures 156a, 156b are positioned on the Y axis, while the second and third throttle apertures 156b, 156c are positioned on the X axis. On the other hand, the light sensing element group 157 comprises first to third light sensing elements 158, 159, 160 which are opposed to the throttle apertures 156a, 156b and 156c, respectively. For example, the light sensing elements 158, 159 and 160 are each constituted by a pin photodiode. As shown in FIG. 25, the first light sensing element 158 opposed to the first throttle aperture 156a has light sensing portion 158a and 158b divided in two in the Y axis direction, and as shown in FIG. 27, the third light sensing element 160 opposed to the third throttle aperture 156c has light sensing portions 160a and 160b divided in two in the X axis direction. Further, as shown in FIG. 26, the second light sensing element 159 opposed to the second throttle aperture 156b has quartered light sensing portions 159a, 150b, 159c and 159d. The set of 159a, 159b and the set of 159c, 159d are divided in the Y axis direction, while the set of 159a, 159c and the set of 150b, 159d are divided in the X axis direction.

Infrared lights emitted at different timings (periods) from the light sources 152, 153 and 154 pass through the visible light cut-off filter 155, then are throttled by the throttle apertures 156a, 156b and 156c of the throttle plate 156 and are radiated as square light spots onto the light-sensitive surfaces of the first to third light sensing elements 158, 159 and 160. At this time, extraneous noise components other than the square infrared light spot are cut off as much as possible in the light sensing element group 157 by means of the visible light cut-off filter 155. In FIG. 25, the infrared light spots from the first and second light sources 152 and 153 are indicated at 152A and 153A, respectively, (as to the infrared light spot from the third light source 154, it is omitted in the figures). In FIG. 26, the infrared light spots from the first, second and third light sources 152, 153 and 154 are indicated at S152B, S153B and S154B, respectively. In FIG. 27, the infrared light spots from the second and third light sources 153 and 154 are indicated at S153C and S154C, respectively, (as to the infrared light spot from the first light source, it is omitted in the figures).

In each of the divided light sensing portions of the light sensing elements 158 to 160 there is obtained a detection current by photoelectric conversion based on the light spot irradiation area and irradiation light intensity. This detection current is then converted to a voltage and subjected to an arithmetic processing. As to the processing circuit, it will be described later. The detection outputs based on the irradiation areas of light spots S152A and S153A in the divided light sensing portions 158a and 158b of the first light sensing element 158 are represented by U and D in FIG. 25. The detection outputs based on the irradiation areas of light spots S152B and S153B in the divided light sensing portions 159a to 159d of the second light sensing element 159 are represented by Lu, Ru, Ld and Rd in FIG. 26. Further, the detection outputs based on the irradiation areas of the light spots S153C and S154C in the divided light sensing portions 160a and 160b of the third light sensing element 160 are represented by Ll and Rr. As mentioned previously, since infrared lights are emitted at different timings from the light sources 152, 153 and 154, the detection timing of light spot S152A and that of light spot S153A in the first light sensing element 158 are different, and the aforementioned detection outputs U and D are obtained for the light spots S152A and S153A, respectively, by making time-division in the processing circuit. Likewise, the above detection outputs Lu, Ru, Ld and Rd are obtained for the light spots S152B and S153B which are applied to the second light sensing element 159, and the detection outputs Ll and Rr are obtained for the light spots S153C and S154C which are directed to the third light sensing element 160.

The space coordinates detecting device constructed as above can functionally be separated into such three optical systems as shown in FIGS. 22 to 24. With respect to each of those optical systems, the detection principle will be described below.

First, the optical system shown in FIG. 22 will be explained. The infrared lights emitted at different timings from the first and second light sources 152 and 153 are throttled by the second throttle aperture 156b and then radiated as light spots S152B and S153B to the divided light sensing portions 159a–159d of the second light sensing element 159, as shown in FIG. 26. In the same figure, if central coordinates of the light spot S152B from the first light sources 152 on the X-Y orthogonal coordinates on the detecting section 151 side are I1 (X1, Y1), central coordinates of the light spot S153B from the second light source 153 are I2 (X2, Y2), and coordinates of the point of intersection between a straight line Oj and the light-sensitive surface of the second light sensing element 159 are Oa (Xo, Yo), the straight line Oj connecting the center or middle point between both light sources 152 and 153 with the center of the throttle aperture 156b, then Oa is positioned intermediate between I1 and I2. The detection state of FIG. 26 represents a relatively rotated state by an angle of θz of the Y axis of X-Y orthogonal coordinates on the light emitting section 150 side where the light sources 152 and 153 are disposed, with respect to the Y axis on the detecting section 151 side. In this case, the rotational angle θz about Z axis is equal to the inclination of a straight line passing through I1 and I2, and:

$$\tan \theta z = (X_2 - X_1)/(Y_2 - Y_1)$$

Thus, $$\theta z = \tan^{-1}[(X_2 - X_1)/(Y_2 - Y_1)] \qquad (11)$$

In the above expression (11), X1 and X2 are determined from the difference between the quantity of light detected by the set of light sensing portions 150b, 159d and that detected by the set of light sensing portions 159a, 159c, which are divided in the X axis direction, with respect to the light spot S152B and S153B. Likewise, Y1, and Y2 are determined from the difference between the quantity of light detected by the set of light sensing portions 159a, 159b and that detected by the set of light sensing portion 159c, 159d, which are divided in the Y axis direction, with respect to the light spots S152B and S153B. That is, the detected outputs Lu, Ru, Ld and Rd in the divided light sensing portions 159a–159d and the coordinates X1, X2, Y1, and Y2 are in a proportional relation and can be represented as follows:

$$X2,X2 \propto [(Ru+Rd)-(Lu+Ld)]/(Ru+Lu+Rd+Ld)$$

$$Y1,Y2 \propto [(Ru+Lu)-(Rd+Ld)]/(Ru+Lu+Rd+Ld) \qquad (12)$$

Therefore, by performing the arithmetic operation of the above expression (12) for the detected outputs Lu, Ru, Ld and Rd provided from the divided light sensing portions 159a–159d of the second light sensing element 159 and by further performing the calculation of the above expression (11), it is possible to determine a relative rotation angle θz of the detecting section 151 with respect to the Z axis.

In FIG. 22, if the X and Y direction components of the inclination angle between the foregoing straight line Oj and the Z axis are θx (radian) and θy (radian), respectively, deviations in X and Y axis directions of coordinates Oa (Xo, Yo) based on the X-Y orthogonal coordinates on the light emitting section 150 side are Δx and Δy, respectively, and the distance from the throttle plate 156 to the light-sensitive surfaces of the light sensing element group 157 is d, then since d is delicate, $$\Delta x = d \cdot \tan \theta x \approx d \cdot \theta x \Delta y = d \cdot \tan \theta y \approx d \cdot \theta y$$

Thus, $$\theta x = \Delta x/d \quad \theta y = \Delta y/d \qquad (13)$$

Since the state of detection shown in FIG. 26 is such that the detecting section 151 has been rotated by the angle θz relative to the Z axis, the X-Y orthogonal coordinates on the detecting section 151 side are in a θz rotated state relative to the X-Y orthogonal coordinates (fixed in space) on the light emitting section 150 side. In FIG. 26, angle θz relative to the X-Y orthogonal coordinates fixed on the detecting section 151 side are set, then θx and θy on the rotatory coordinates are $$\Delta x = X_o \cos \theta z + Y_o \sin \theta z$$

$$\Delta y = -X_o \sin \theta z + Y_o \cos \theta z \qquad (14)$$

Further, X0 and Y0 are determined as $$X_o = (X_1 + X_2)/2 \quad Y_o = (Y_1 Y_2)/2 \qquad (15)$$

Since d is known in the above expressions (13) to (15), the inclinations θx and θy of the Z axis relative to the X-Y orthogonal coordinates on the light emitting section 150 side can be determined by calculating X1, X2, Y1, and Y2 from the outputs Lu, Ru, Ld and Rd detected in the divided light sensing portions 159a–159d of the second light sensing element 159 in accordance with the above expression (12) and by performing the calculations of the expressions (13) to (15) on the basis of the results of the calculation.

In FIG. 22, moreover, if the distance in the Z axis direction between the light emitting section 150 and the detecting section 151 is L and the distance between I1 and I2 at the light-sensitive surface of the second light sensing element 159 is b, the relation of these L and b to the foregoing a (distance between both light sources 152 and 153) and d (distance between the throttle plate 156 and the light-sensitive surfaces of the light sensing element group 157) is as follows:

$$L/d = a/b$$

Thus, $$L = a \cdot a/b \qquad (16)$$

In the above expression (16), a and d are known and b can be expressed as follows from the positions of I1 (X1, Y1,) and I2 (X2, Y2) on the X-Y orthogonal coordinates on the detecting section 11 side:

$$b = \sqrt{[((X_1-X_2)^2+(Y1Y2)^2]} \qquad (17)$$

Therefore, by calculating X1, X2, Y1, and Y2 from the outputs Lu, Ru, Ld and Rd detected in the divided light sensing portions 159a–159d of the second light sensing element 159 in accordance with the above expression (12), the distance b can be determined on the basis of the results of the calculation and in accordance with the expression (17) and further it is possible to determine the distance L in accordance with the expression (16). When the distance L changes from L1 to L2, the resulting displacement ΔL can be determined as follows:

$$L = L_2 = L_1$$

In connection with the optical system of FIG. 22, although description has been made above with respect to the case where infrared lights emitted at different timings from the first and second light sources 152, 153 are used, the foregoing θz, θx, θy and L can be determined also in the case of using infrared lights emitted at different timings from the second and third light sources 153 and 154. In this case, however, since the second and third light sources 153 and 154 are arranged in the X axis direction, the rotational angle θz around the Z axis means a relative rotational angle between the X axis on the light emitting section 150 side and the X axis on the detecting section 151 side.

The optical system of FIG. 23 will now be described. The infrared lights emitted at different timings from the first and second light sources 152 and 153 are throttled by the throttle apertures 156a and 156b, then radiated as light spots S152A and S152B to the divided light sensing portions 158a and 158b of the first light sensing element 158 and also radiated as light spots S152B and S153B to the divided light sensing portions 159a–159d of the second light sensing element 159. FIG. 28 schematically shows the optical system of FIG. 23 with the detecting section 151 being in a certain posture. For convenience's sake, Z-Y orthogonal coordinates are set on the detecting section 151 side.

In FIG. 28, if the coordinates of the first light source 152 on the Z-Y orthogonal coordinates on the detecting section 151 side are P1 (Z1, Y1), the coordinates of the second light source 153 are P2 (Z2, Y2), the spacing in the Y axis direction between the first and second light sensing elements 158, 159 is m, and the angles between the optical axes of the infrared lights emitted from both light sources 152 and 153 and the Y axis are α1, α2, β1, β2, then α1, α2, β1, β2 are determined from the light spots S152A, S152B, S153A and S153B, respectively. That is, a displacement θy between the light spots S152A and S153A on the first light sensing element 158 shown in FIG. 25 is expressed as follows:

$$\Delta y \propto (U-D)/(U+D)$$

Thus, the angles α1 and β1 can be determined by substituting the outputs U and D detected in both divided light sensing portions 158a and 158b of the first light sensing element 158 and the known value d into the expressions α1=Δy/d and β1=Δy/d. Further, a displacement θy between the light spots S152B and S153B on the second light sensing element 159 shown in FIG. 26 is expressed as follows:

$$\Delta y \propto [(Ru+Ld)]/(Ru+Lu+Rd+Ld)$$

Thus, the angles α2 and β2 can be determined by substituting the outputs Lu, Ru, Ld and Rd detected in the divided light sensing portions 159a–159d of the second light sensing element 159 and the known value d into the expressions α2=Δy/d and β2=Δy/d. Once α1, α2, β1 and β2 are determined in this way, the coordinates of P1 (Z1, Y1) are determined from the known value of m and the values of β1 and β2 in accordance with the principle of trigonometrical measurement, and the coordinates of P2 (Z2, Y2) are determined likewise from the values of m, β1 and β2.

Once the coordinates of P1 and P2 are determined in the above manner, there are determined a relative angle θy between the light emitting section 150 and the detecting section 151, a relative displacement Q in the Y axis direction between both sections 150 and 151 and a relative Z-axis displacement L between both sections 150 and 151. More particularly, θy is equal to the inclination of a straight line passing through P1 and P2 and since $$\tan \theta y = (Y_1 - y_2)/(Z_1 - Z_2)$$

θy can be expressed as $$\theta y = \tan^{-1}[(Y_1 - Y_2)/(Z_1 - Z_2)] \quad (18)$$

Thus, by substituting the values of Z1, Z2, Y1, and Y2 which have been calculated from the outputs U and D detected by the first light sensing element 158 and the outputs Lu, Ru, Ld and Rd detected by the second light sensing element 159 into the above expression (18), there is determined a relative angle θy between the light emitting section 150 and the detecting section 151.

If the coordinates of a middle point between P1 and P2 are Po (Zo, Yo), Zo and Yo can be expressed as follows:

$$Z_o = (Z_1 + Z_2)/2, Y_o = (Y_1 + Y_2)/2$$

Therefore, transformation into a rotatory coordinate system gives the values of Q and L as follows:

$$Q = -Z_o \sin \theta y + Y_o \cos \theta y$$

$$L = Z_o \cos \theta y + Y_o \sin \theta y \quad (19)$$

By substituting the foregoing Zo and Yo which have been calculated From Z1, Z2, Y1, Y2 and the value of θy which has been calculated in the above expression (9), into the above expression (19), there are obtained a relative Y-axis displacement Q between the light emitting section 150 and the detecting section 151 and a relative Z-axis displacement L between both sections 150 and 151.

Lastly, reference will now be made to the optical system of FIG. 24. Infrared lights emitted at different timings from the second and third light sources 153, 154 are throttled by the second and third throttle apertures 156b, 156c, then radiated as light spots S153B and S154B to the divided light sensing portions 159a–159d of the second light sensing element 159 and also radiated as light spots 153C and 154C to the divided light sensing portions 160a and 160b of the third light sensing element 160. In this case, the detection principle is basically the same as that of the optical system shown in FIG. 23. By using the detected outputs L1 and Rr provided from the divided light sensing portions 160a and 160b of the third light sensing element 160, in place of the detected outputs U and D provided from the first light sensing element 158, there are obtained a relative X-axis displacement T between both sections 150 and 151 as well as a relative Z-axis displacement L between both sections.

Figure 29:
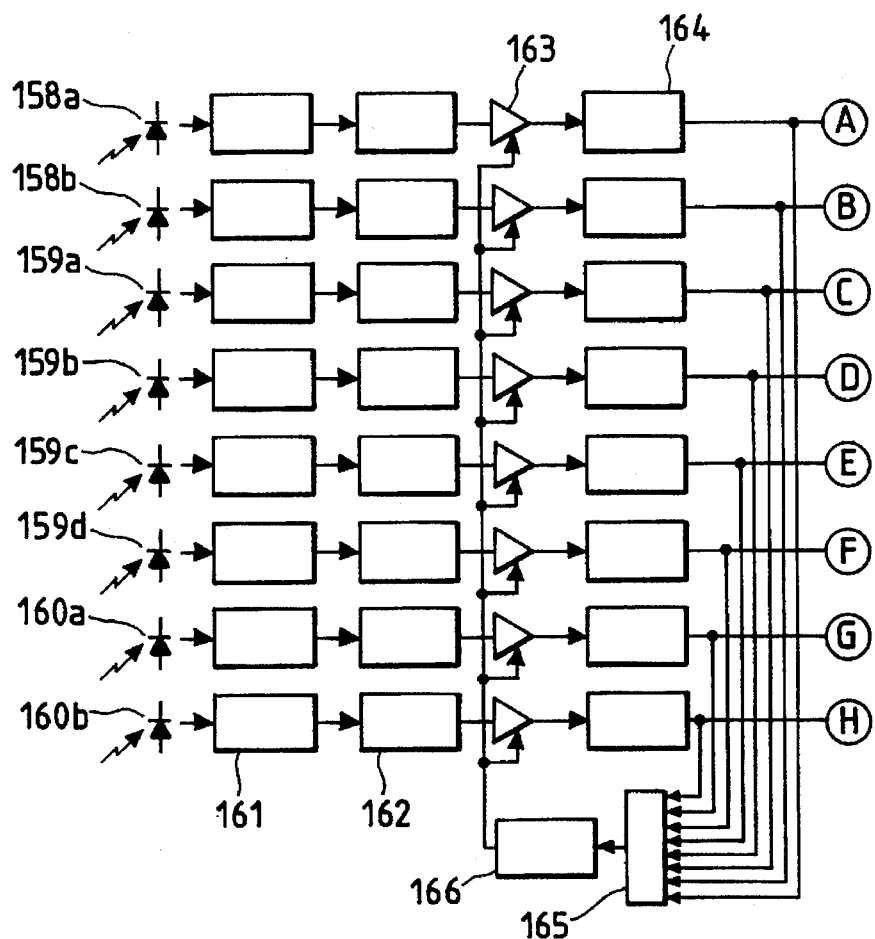
FIG. 29 is a block diagram showing a circuit configuration used in the space coordinates detecting device of FIG. 21.
Figure 30:
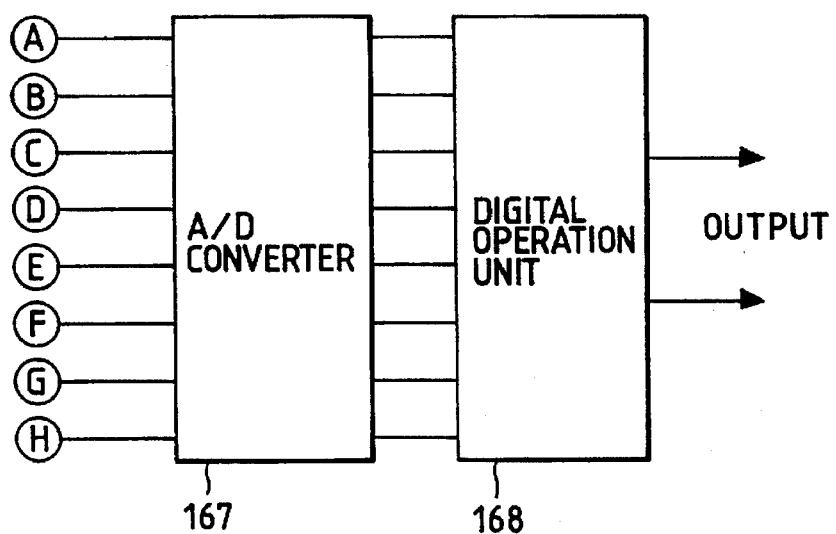
FIG. 30 is a block diagram showing a latter stage of the circuit of FIG. 29.

Referring now to FIGS. 29 and 30, there is illustrated a circuit configuration used in the space coordinates detecting device of the above embodiment.

Infrared lights having the same frequency and which are 120° out of phase with one another are emitted intermittently from the light sources 152, 153 and 154. Consequently, a detected output exhibiting a substantially sine curve change which corresponds to the above pulse period is obtained in each of the divided light sensing portions 158a and 158b of the finest light sensing element 158, the divided light sensing portions 159a–159d of the second light sensing element 159 and the divided light sensing portions 160a and 160b of the third light sensing element 160.

As shown in FIG. 29, a current-to-voltage converter 161 is connected to each of the divided light sensing portions, whereby the current value of the detected output in each light sensing portion is converted to a voltage value. Each output voltage passes through a band-pass filter 162, whereby the frequency component of pulsative (intermittent light) emission is removed. Then, each detected voltage is amplified by an amplifier 163, followed by detection in a detector 164, so that a voltage proportional to the quantity of light received by each divided light sensing portion is taken out as DC component. Further the voltage outputs from the detectors 164 are added as voltage values by means of an adder 165 and the result is provided to an auto gain control circuit 166, which in turn controls the amplification factor of the amplifier 163.

The detection voltage from each detector 164 is converted to a digital value by means of an analog-to digital converter 167 as shown in FIG. 30 for example and the operations of sum, difference, quotient and product are performed by means of a digital operation unit 168. That is, the arithmetic operations of the foregoing expression (11) to (19) are conducted by the digital operation unit 168, which corresponds to the operation section in the present invention.

Figure 31:
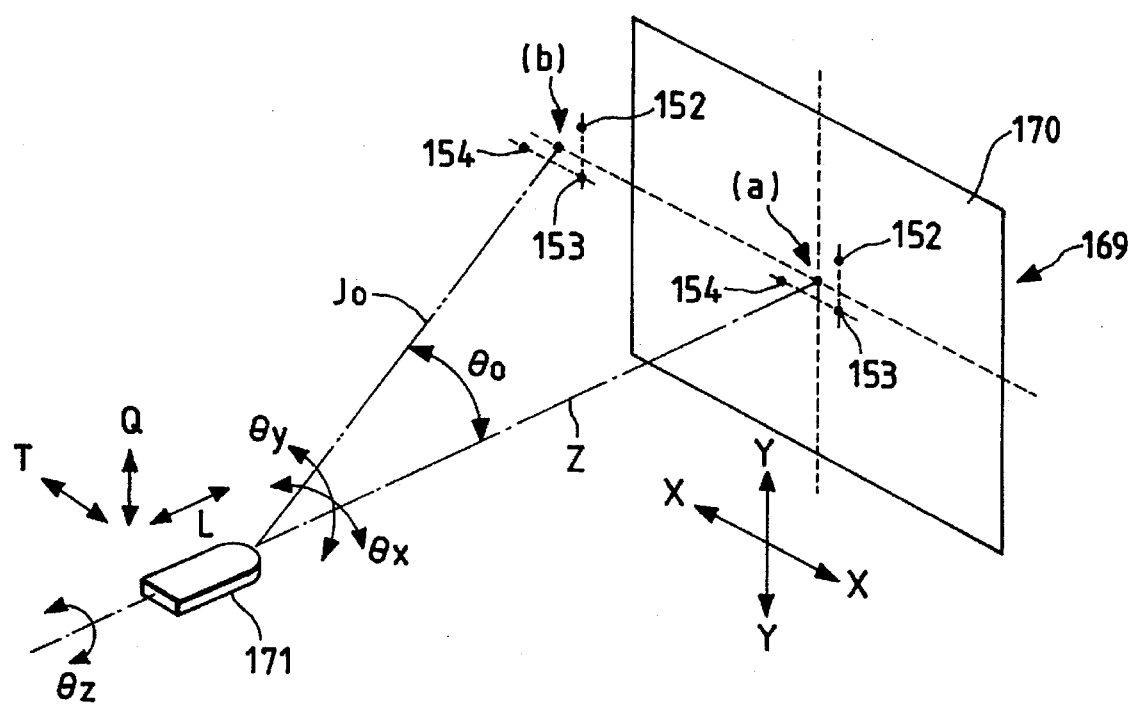
FIG. 31 is a perspective view of an input apparatus using the space coordinates detecting device of FIG. 21.

Referring now to FIG. 31, there is illustrated a schematic configuration of an input apparatus using input apparatus includes an apparatus body 169 on its stationary side. For example, the apparatus body 169 is the body of a computer, an AV apparatus, or a game machine, and has a CRT screen 170. On a moving side thereof is disposed an operating member 171. The operating member 171, which functions as a remote controllers is formed in a size which permits an operator to carry it by hand and move.

The light emitting section 150 is disposed in an arbitrary position of the apparatus body, while the detecting section 151 is formed at the front face of the operating member 171. The arithmetic operations of the foregoing expressions (11) to (19) are performed within the operating member 171 and the results thereof are transmitted to the apparatus body 169 by wire or wireless. Alternatively, only the output detected in the detecting section 151 is transmitted to the apparatus body 169, which in turn performs the above arithmetic operations.

In FIG. 31 the center or middle point of the light sources 152, 153 and 154 is shown in the position of the center (a) of the screen 128, but in the actual apparatus the center of the light sources 152, 153 and 154 lies in a position outside the screen 170, say, the position indicated at (b). In this case, when the axis extending in front of the detecting section 151 is directed to the center of the screen 170, there arises an offset angle θo between a line Jo and the Z axis which line Jo connects the center of the detecting section 151 with the center of the light emitting section 150. In this case, by subtracting the offset angle θo from a detected angle in the Y direction detected by the detecting section 151, it is possible determine the direction (opposition angle) θy of the Z axis relative to the screen 170.

According to this input apparatus, even when the operating member 171 rotates by the angle θz relative to the Z axis, the inclination angles θx and θy in the X and Y directions relative to the X-Y coordinates (fixed coordinates in space) on the apparatus body 169 side can be detected taking the rotational angle θz into account. Therefore, even if the operating member 171 held by hand is in a rotated state by the angle θz, it is possible to provide the apparatus body 169 with information relating to the inclinations θx and θy. For example, a cursor mark displayed on the screen 170 can be moved on the X-Y coordinates. That is, by moving the operating member 171 freely in the space it becomes possible to make inputs for instructing image processing on the screen 170 such as, for example, drawing a line or setting the cursor mark to a button indication on the screen and conducting switching operation to change over the picture plane from one to another. In this case, even if the operating member 171 held by hand should rotate relative to the Z axis, it is not likely that this rotation will cause malfunction of the input action for the X-Y coordinates.

In this input apparatus, moreover, the rotational angle θz of the operating member 171 relative to the Z axis can be utilized as directive information for the display on the screen 170 of the apparatus body 169. For example, by turning the operating member 171 by the angle θz, an image which has appeared on the screen 170 can be rotated within the X-Y coordinates on the apparatus body 169 side. This can be utilized in character rotating motion in plotting or in software for a game machine.

Further, in this input apparatus, relative displacements Q and T in the Y and X axis directions respectively, between the apparatus body 169 and the operating member 171 can be detected, so it is possible to utilize these Q and T as directive information for the display on the screen 170 of the apparatus body 169.

Moreover, since information of the distance L up to the operating member 171 can be given to the apparatus body 169 side, it is possible to prevent the operator from feeling a difference in the operation touch between the case where the operating member 171 is close to the screen 170 and the case where it is positioned away from the screen. More particularly, if the cursor mark is moved on the screen 170 on the basis of only the inclination angles in the θx and θy directions of the operating member 171, then for example between the case where the operating member 171 is inclined in the θx direction in a position close to the screen 170 and the case where the operating member is inclined by the same angle in the θx direction in a position spaced sufficiently from the screens there is no difference in the displacement, or moving distance, of the cursor mark moving on the screen in accordance with information of such inclination angle θx. Consequently, when the operating member 171 is tilted in a position away from the screen 170, there is created a feeling that the cursor mark does not move so much on the screen. With this point in view, if there is made correction so that as the distance L between the light emitting section 150 and the detecting section 151 increases, the moving distance of the cursor mark on the screen 170 becomes longer relative to the tilting of the operating member 171 in the θx or θy direction, while taking into account the distance L which has been calculated in accordance with the foregoing expression (6) or (9), then it is possible to compensate for the difference in the operation touch between the case where the operating member 171 is close to the screen 170 and the case where it is spaced apart from the screen.

In contrast therewith, when the operating member 171 is spaced fairly long from the screen 170, the above correction may result in that a slight tilt of the operating member causes a large movement of the cursor mark on the screen, leading to error of the operation input due to hand shaking. This can be avoided by making correction reverse to the above in such a manner that when the distance L becomes long, the moving distance of the cursor mark on the screen 170 is kept short relative to the inclinations θx and θy of the operating member 171.

Although in the above fourth embodiment a quartered light sensing element having light sensing portions 159a–159d divided in the X and Y directions has been used as an example of the second light sensing element 159, there may be used light sensing elements divided in two in the X direction and light sensing elements divided in two in the Y direction, which are disposed extremely close to each other. In this case, the number of throttle apertures increases by one and a total of four such apertures are formed because it is necessary that the light spots from the light sources 152, 153 and 154 be directed to both sets of divided light sensing elements.

The fifth embodiment of the present invention will be described below with reference to the drawings.

Figure 32:
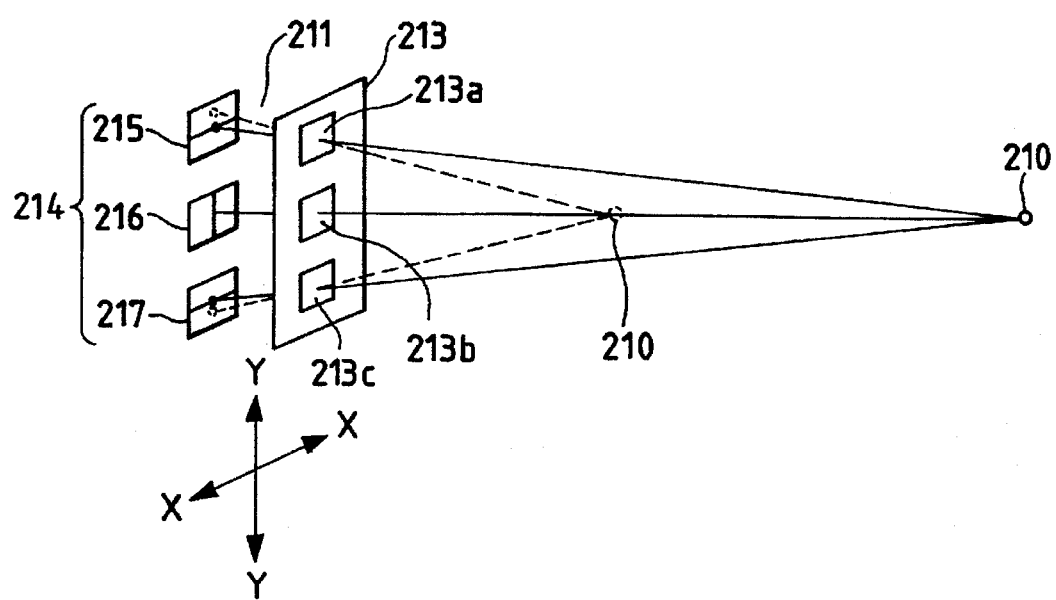
FIG. 32 is a perspective view showing a basic structure of a space coordinates detecting device according to the fifth embodiment of the present invention.
Figure 35:
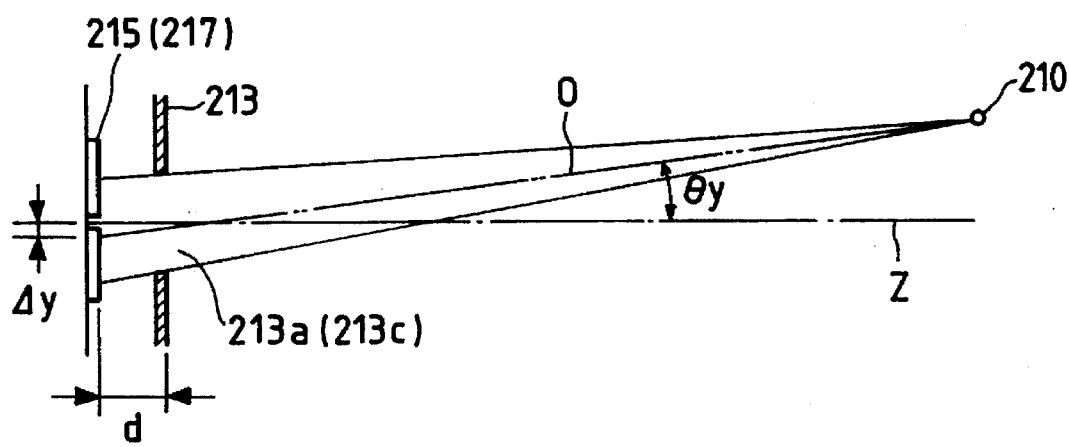
FIG. 35 is an explanatory view showing an angle detecting principle in the space coordinates detecting device of FIG. 32.
Figure 36:
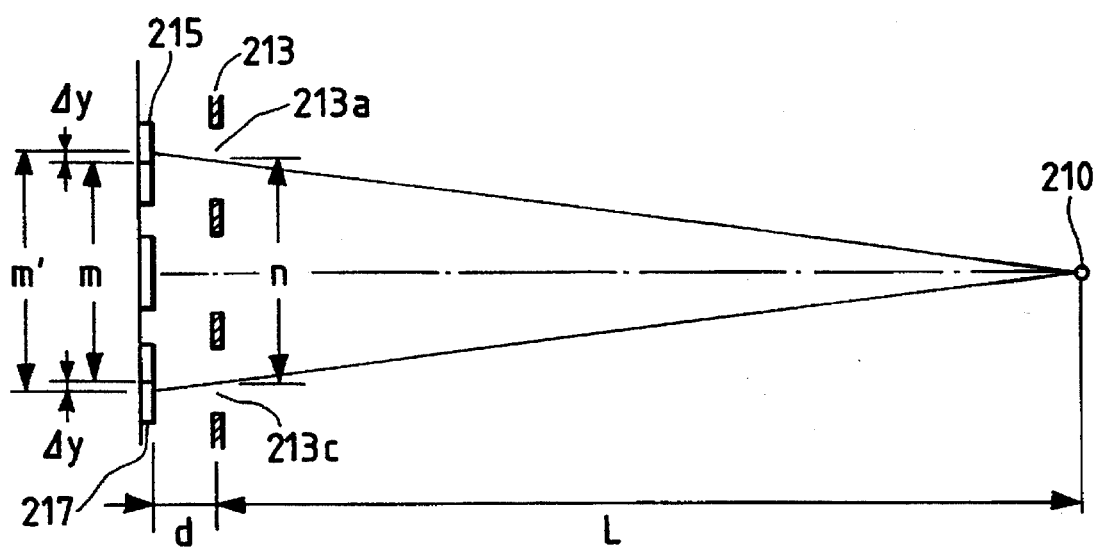
FIG. 36 is an explanatory view showing a distance detecting principle in the same device.

FIG. 32 is a perspective view showing a basic structure of a space coordinates detecting device according to the fifth embodiment of the present invention, FIG. 33 is a sectional view thereof, FIG. 34 is a plan view of light sensing elements used in the space coordinates detecting device, FIG. 35 is an explanatory view showing an angle detection principle of the space coordinates detecting device, and FIG. 36 is an explanatory view showing a distance detection principle of the space coordinates detecting device.

According to this fifth embodiment, a light source 210 is constituted by an infrared-emitting diode for example, from which is emitted a distinguishable light. A detecting section 210 comprises a visible light cut-off filter 212, a throttle plate 213 and a light sensing element group 214. As shown in FIG. 33, the visible light cut-off filter 212, throttle plate 213 and light sensing element group 214 are arranged in this order successively from the light source 210 light side and in parallel with one another, provided the visible light cut-off filter 212 is omitted in FIG. 32.

An axis perpendicular to the light sensing element group 214 is assumed to be Z axis and X-Y orthogonal coordinates orthogonal to the Z axis are set in the detecting section 211. In this state, three square throttle apertures 213a, 213b, 213c are formed in the throttle plate 213 at predetermined spacings in the Y axis direction. On the other hand, the light sensing element group 214 comprises three light sensing elements 215, 216 and 217 opposed to the throttle apertures 213a, 213b and 213c, respectively. For example, the light sensing elements 215, 216 and 217 are each constituted by a pin photodiode. As shown in FIG. 34A, the light sensing element 215 opposed to the upper throttle aperture 213a has light sensing portions 215a and 215b divided in two in the Y axis direction, which light sensing element will hereinafter be referred to as the "first Y-side light sensing element." As shown in FIG. 34B, the light sensing element 216 opposed to the central throttle aperture 213b has light sensing portions 216a and 216b divided in two in the X axis direction, which light sensing element will hereinafter be referred to as the "X-side light sensing element." As shown in FIG. 34C, the light sensing element 217 opposed to the lower throttle aperture 213c has light sensing portions 217a and 217b divided in two in the Y axis direction, which light sensing element will hereinafter be referred to as the "second Y-side light sensing element."

The infrared emitted from the light source 210 passes through the visible light cut-off filter 212, then is throttled by the throttle apertures 213a, 213b and 213c of the throttle plate 213 and is radiated as square spots onto the light-sensitive surfaces of the light sensing element group 214. At this time, extraneous noise components other than the square infrared light spots are cut off as much as possible in the light sensing element group 214 by means of the visible light cut-off filter 214. In FIG. 34, the infrared light spot directed to the divided light sensing portions 215a and 215b of the first Y-side light sensing element 215 is represented by S215, the infrared light spot directed to the divided light sensing portions 216a and 216b of the X-side light sensing element is represented by S216, and the infrared light spot applied to the divided light sensing portions 217a and 217b of the second Y-side light sensing element 217 is represented by S217.

In each of the divided light sensing portions of the light sensing elements 215 to 217 there is obtained a detection current by photoelectric conversion based on the irradiation area and intensity of each of the light spots S215 to S217.

The detection current is then converted to a voltage and subjected to an arithmetic processing. Reference to the processing circuit will be made later. In FIG. 34, the detection outputs based on the irradiation areas of light spots S215 and S217 are represented by U and D, while the detection outputs based on the irradiation area of the light spot 216 is represented by L and R. As mentioned previously, since the light sensing portions 215a, 215b and 217a, 217b of the first and second Y-side light sensing elements 215, 217 are respectively divided in two in the Y axis direction, U and D are equal to each other when the centers of the light spots S215 and S217 are each positioned centrally of both divided light sensing portions, while when both centers are displaced in the Y axis direction, U and D take different values. Likewise, since the divided light sensing portions 216a and 216b of the X-side light sensing element 216 are divided in two in the X axis direction, L and R are equal to each other when the center of the light spot S216 lies in the center of both divided light sensing portions, when the center of the light spot S216 deviates in the X axis direction, L and R take different values.

As shown in FIG. 35, if a line connecting the light source 210 with the center of the detecting section 211 is O and the angle of inclination between Z axis extending in front of the detecting section 211 and the line O is θ (radian), then components θx and θy in the X and Y directions of the inclination angle θ can be determined in the following manner.

First, displacements Δx and Δy of the centers of the light spots S215 to S217 in the light sensing elements 215 to 217 shown in FIG. 34 can be expressed as follows:

$$\Delta x \propto (R-L)/(R+L) \qquad (21)$$

$$\Delta y \propto (U-D)/(U+D) \qquad (22)$$

In the above expressions 21 and 22, the division by the denominator (R+L) or (U+D) takes the variation in the irradiation light intensity into account. FIG. 35 shows a state in which the detecting section 211 has been inclined by the angle θy in the Y axis direction relative to the Z axis. In this case, the centers of the light spots S215 and S217 are displaced by Δy relative to the divided light sensing portions 215a, 215b of the first Y-side light sensing element 215 and the divided light sensing portions 217a, 217b of the second Y-side light sensing element 217.

In FIG. 35, given that the distance from the throttle plate 213 up to the light-sensitive surfaces of the light sensing elements 215–217 is d, since d is delicate, $$\Delta y = d \cdot \tan \theta y = d \cdot \theta y$$

$$\theta y = \Delta y / d \qquad (23)$$

In the above expression (23), d is known and Δy can be determined by giving U and D into the above expression (22), so θy can be calculated from the values of U and D, provided Δy may be determined from the values of U and D corresponding to one of the first and second Y-side light sensing elements 215, 217, or may be determined from a mean value of U and D values corresponding to both Y-side light sensing elements 215 and 217. By replacing Δy in the above expression (23) with Δx, θx is obtained as follows:

$$\theta x = \Delta x / d \qquad (24)$$

Also in this expression (24), d is known and Δx is determined by giving the values of L and R into the above expression (21), so θx can be calculated from the values of L and R corresponding to the X-side light sensing element 216.

On the other hand, if the distance in the Z axis direction between the light source 210 and the detecting section 211 is L, as shown in FIG. 36, then with variation of the distance L, the center of the light spot S215 and that of the light spot S217 for the divided light sensing portions 215a, 215b of the first Y-side light sensing element 215 and the divided light sensing portions 217a, 217b of the second Y-side light sensing elements deviate by Δy in opposite directions and therefore the distance L can be determined in the following manner.

In FIG. 36, if the distance between the centers of the first and second Y-side light sensing elements 215, 217 is m, the distance between the centers of the light spots S215 and S217 applied to the first and second Y-side light sensing elements 215 and 217, respectively, is m', and the distance between the centers of the upper and lower throttle apertures 213a, 213c is n, then m' can be expressed as follows:

$$m' = m + 2\Delta y \qquad (25)$$

In FIG. 36, moreover, a triangle including the throttle plate 213 as the base and a triangle including the light-sensitive surfaces of the light sensing elements 215 to 217 are analogous to each other, so the following relationship is obtained according to the principle of trigonometrical measurement:

$$n:m' = L:(L+d)$$

$$L = nd/(m'-n) \qquad (26)$$

In the above expression (26), n, m and d are known and m' is determined by substituting the Δy obtained in the expression (22) into the expression (26), so L can be calculated from the values of U and D corresponding to both Y-side light sensing elements 215 and 217.

Figure 37:
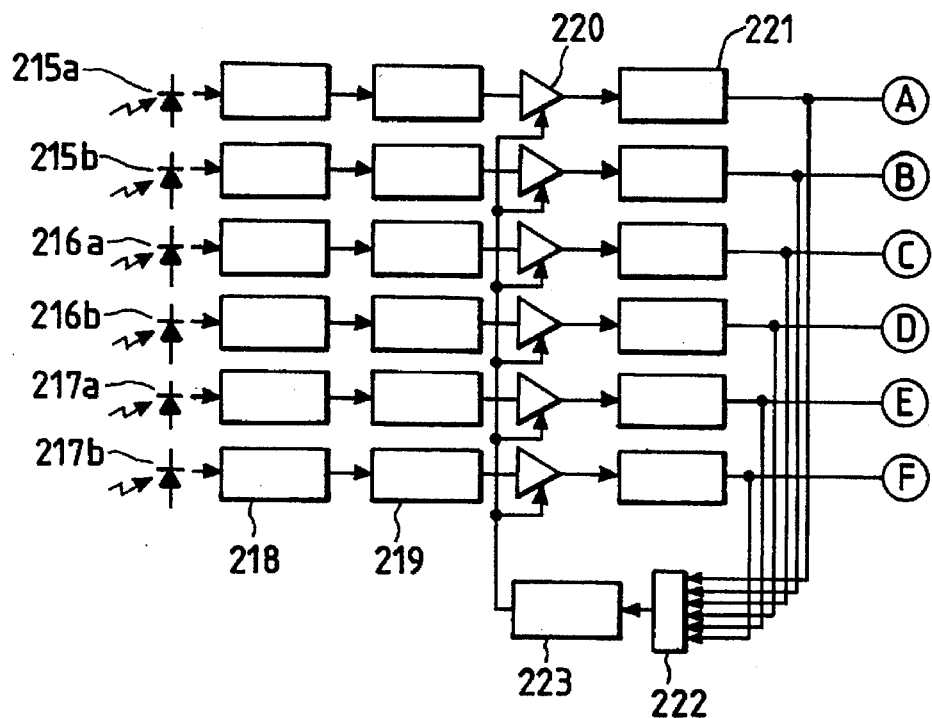
FIG. 37 is a block diagram showing a circuit configuration used therein.
Figure 38:
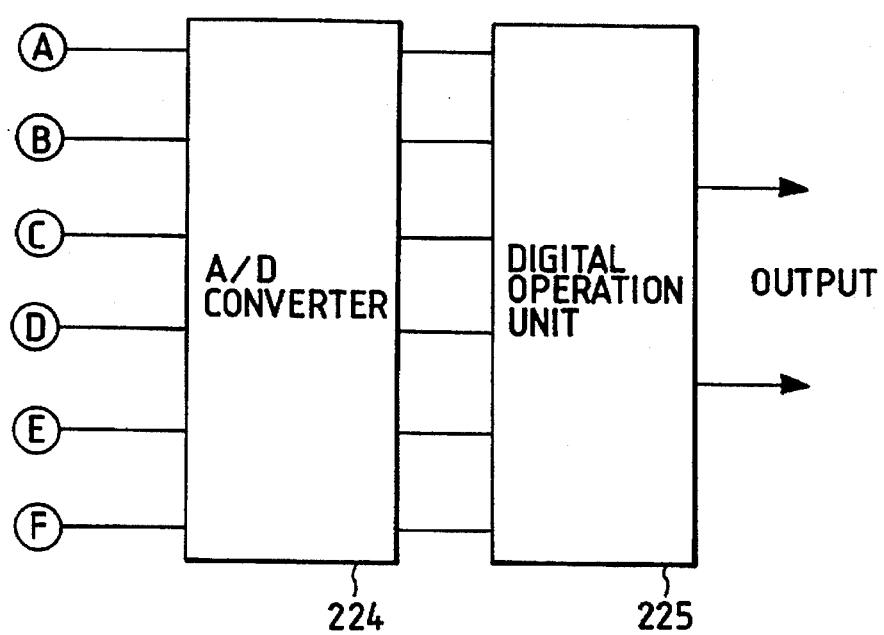
FIG. 38 is a block diagram showing a latter stage of the circuit of FIG. 37.

FIGS. 37 and 38 illustrate a circuit configuration used in the space coordinates detecting device of the above fifth embodiment.

The emission of light from the light source 210 is an intermittent light emission based on certain pulses. Consequently, outputs which exhibit a substantially sine curve change corresponding to the above pulse period are detected in the divided light sensing portions 215a, 215b; 216a, 216b; and 217a, 217b.

In FIG. 37, a current-to-voltage converter 218 is connected to each of the divided light sensing portions, whereby the current value of the output detected in each divided light sensing portion is converted to a voltage value. Each output voltage passes through a band-pass filter 219 to remove the frequency component of pulsative (intermittent) light emission. Then, each detected voltage is amplified by an amplifier 220, followed by detection in a detector 221, so that a voltage proportional to the quantity of light received by each divided light sensing portion is taken out as DC component. Further, the voltage outputs from the detectors 221 are added as voltage values by means of an adder 222 and the result is provided to an auto gain control circuit 223, which in turn controls the amplification factor of the amplifier 220.

The detection voltage from each detector 221 is converted to a digital value by means of an analog-to-digital converter 224 and the operations of sum, difference, quotient and product are performed by means of a digital operation unit 225. That is, the arithmetic operations of the foregoing expressions (21) to (26) are conducted by the digital operation unit 225, which corresponds to the angle computing section and distance computing section in the present invention.

Figure 39:
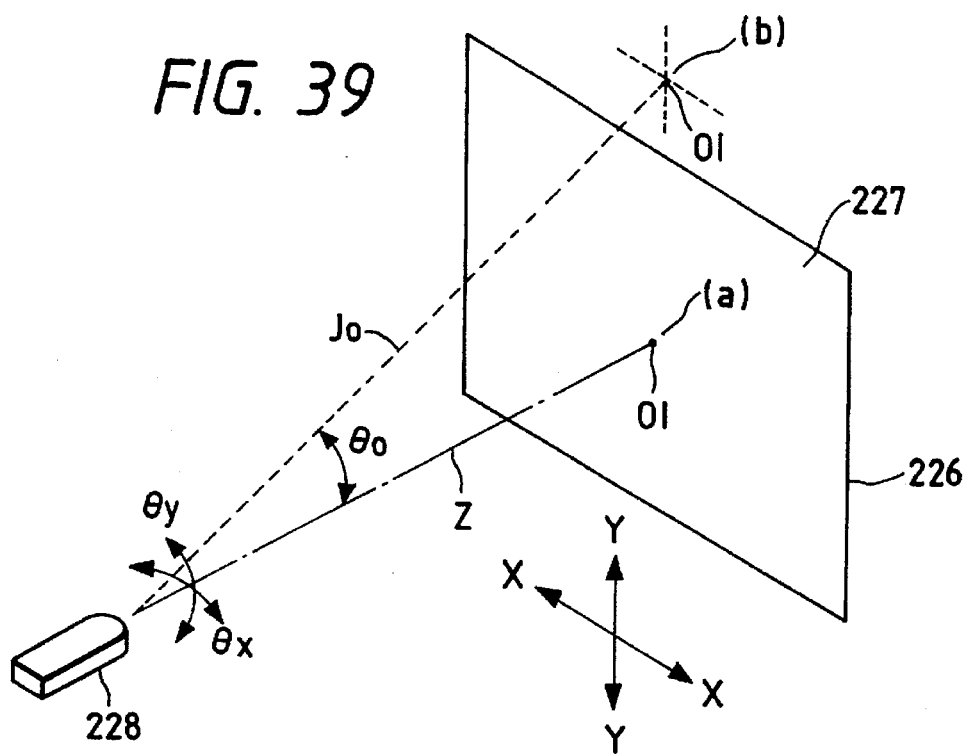
FIG. 39 is a perspective view of an input apparatus using the space coordinates detecting device of FIG. 32.
Figure 40:
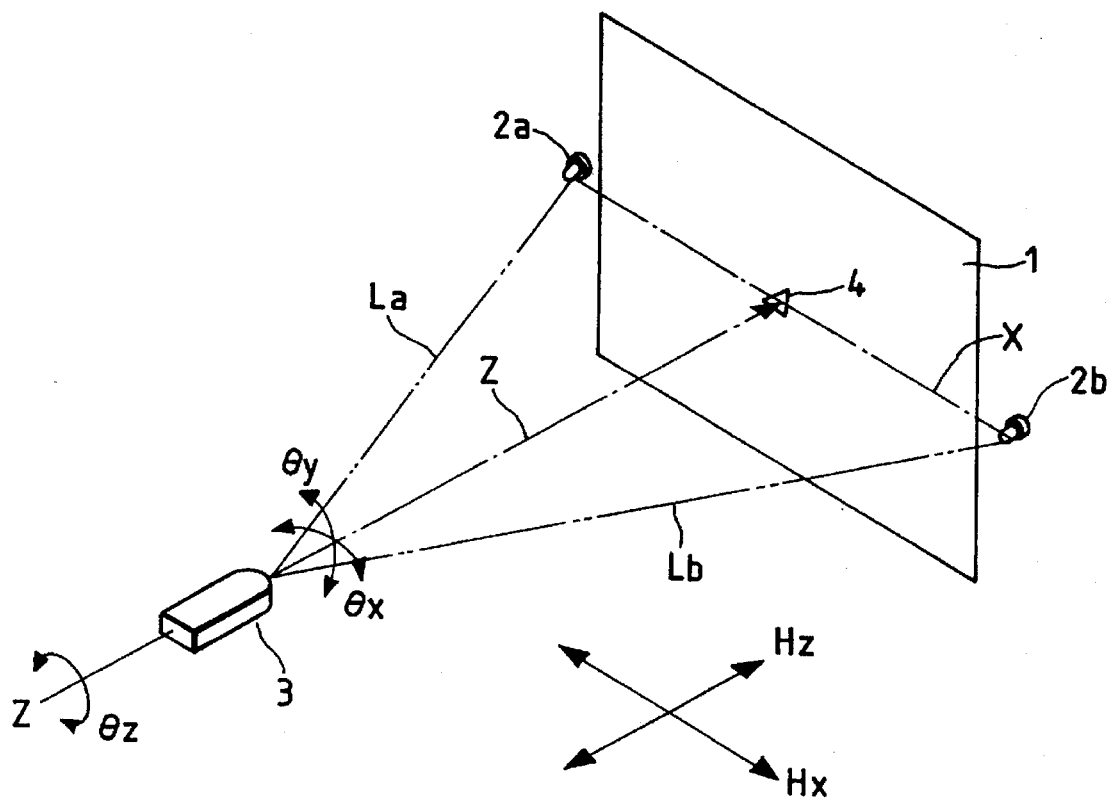
FIG. 40 is a perspective view showing a conventional input apparatus.

FIG. 39 illustrates a schematic configuration of an input apparatus using the space coordinates detecting device of the above fifth embodiment. This input apparatus includes an apparatus body 226 on its stationary side and, for example, it is the body of a computer, an AV apparatus, or a game machine, having a CRT screen 227. On a moving side thereof is disposed an operating member 228. The operating member 228, which functions as a remote controller, is formed in a size which permits an operator to carry it by hand and move.

The light source 210 is disposed in an arbitrary position of the apparatus body 226, while the detecting section 211 is formed at the front face of the operating member 228. The arithmetic operations of the foregoing expressions (21) to (26) are performed within the operating member 228 and the results thereof are transmitted to the apparatus body 226 by wire or wireless. Alternatively, only the output detected in the detecting section 211 is transmitted to the apparatus body 226 and the above arithmetic operations are performed on the apparatus body side.

In FIG. 39, the center O1 of the light source 210 is indicated at the central position (a) of the screen 227, but in the actual apparatus the center of the light source 210 lies in a position outside the screen 227, say, the position indicated at (b). In this case, when the Z axis extending in front of the detecting section 211 is directed to the center of the screen 227, there arises an offset angle θo between a line Jo and the Z axis which line Jo connects the center of the detecting section 211 with the center of the light source 21. In this case, by subtracting the offset angle θo from a detected angle in the Y direction detected by the detecting section 211, it is possible to determine the direction (opposition angle) θy of the Z axis relative to the screen 227.

In this input apparatus, information relating to the inclinations θx and θy of the operating member 228 can be given to the apparatus body 226 side, so by moving the cursor mark on the screen 227 in accordance with the information on the apparatus body 226 side, the operator can feel movement of the cursor mark upon tilting of the operating member 228 and thus by remote control of the operating member it becomes possible to make a cursor indicating input for the screen 227.

Further, since information of the distance L up to the operating member 228 can be given to the apparatus body 226 side, it is possible to prevent the operator from feeling a difference in the operation touch between the case where the operating member 228 is close to the screen 227 and the case where it is positioned away from the screen. More particularly, if the cursor mark is moved on the screen 227 on the basis of only the inclination angles in the θx and θy directions of the operating member 228, then for example between the case where the operating member is inclined in the θx direction in a position close to the screen and the case where the operating member is inclined by the same angle in the θx direction in a position spaced sufficiently from the screen, there is no difference in the displacements or moving distance, of the cursor mark moving on the screen in accordance with information of such inclination angle θx. Consequently, when the operating member 228 is tilted in a position away from the screen 227, there is created a feeling that the cursor mark does not move so much on the screen. In view of this point, if there is made correction so that as the distance L between the light source 210 and the detecting section 211 increases, the moving distance of the cursor mark on the screen 227 becomes longer relative to the tilting of the operating member 228 in the θx or θy direction, while taking into account the distance L which has been calculated in accordance with the foregoing expression ㉖, then it is possible to compensate for the difference in the operation touch between the case where the operating member 228 is close to the screen 227 and the case where it is spaced apart from the screen.

Conversely, when the operating member 228 is spaced fairly long from the screen 227, the above correction may result in that a slight tilt of the operating member causes a large movement of the cursor mark on the screen, leading to error of the operation input due to hand shaking. This can be avoided by making correction reverse to the above so that when the distance L becomes long, the moving distance of the cursor mark on the screen 227 is kept short relative to the inclinations θx and θy of the operating member 228.

According to the present invention, as set forth above, a relative rotational angle between the light sensing section and the detecting section with respect to the axis which connects both sections can be detected, so when the space coordinates detecting device of the present invention is applied to an input apparatus, it becomes possible to provide information relating to the rotational angle as well as instructions from the operating member to the apparatus body.

Moreover, inclination information can be obtained taking a relative rotation angle between the light emitting section and the detecting section into account, so even when the detecting section is provided on the moving side such as the operating member, it is possible to input information on inclination angles θx and θy in the x and y axis directions to the apparatus body on the stationary side.

Further, not only relative inclination angle and rotation angle between the light emitting section and the detecting section with respect to the axis which connects both sections, but also relative distances in Z and Y axis directions of both sections, can be detected with a high accuracy using a simple structure. Therefore, when this space coordinates detecting device is applied to an input apparatus, the movement of a cursor mark on the screen can be controlled in accordance with the above inclination angles while taking into account the rotative components of the orthogonal coordinates of the operating member held by hand. Besides, by also taking into account the foregoing distances in the Z and Y axis directions, it is possible to compensate for the difference in the operation touch caused by variation in the distance between the light emitting section and the detecting section.

Additionally, not only relative inclination angle and rotation angle between the light emitting section and the detecting section with respect to the axis which connects both sections, but also relative distances in X, Y and Z axis directions of both sections, can be detected in a highly accurate manner using a simple structure. Accordingly, in the case where this space coordinates detecting device is applied to an input apparatus, the movement of a cursor mark on the screen can be controlled in accordance with the above inclination angles while taking into account the rotative components of the orthogonal coordinates of the operating member held by hand. Besides, the difference in the operation touch caused by variation in the distance between the light emitting section and the detecting section can be compensated by taking the foregoing distances in the X, Y and Z axis directions.

What is claimed is:

1. A space coordinates detecting device characterized in that a light emitting section and a detecting section are disposed in spaced relation to each other, said light emitting section having two light sources each adapted to emit a distinguishable light and spaced from each other, said detecting section having an aperture for making each light into a light spot of a predetermined area, said detecting section further having an X side light sensing portion for detecting movement in X axis direction of each light spot and a Y side light sensing portion for detecting movement in Y axis direction of each light spot when X-Y orthogonal coordinates intersecting an axis which passes through the center of said aperture are set, and there is provided a computing section which determines the position of each light spot on the basis of a difference in the amount of light received in the X side light sensing portion between both light spots and a difference in the amount of light received in the Y side light sensing portion and then determines an inclination angle of a line connecting the centers of both light spots on said X-Y coordinates.

2. A space coordinates detecting device according to claim 1, wherein rotatory coordinates Xα-Yα obtained by rotating said X-Y orthogonal coordinates by said inclination angle are set, and the position of a middle point between both said light spots on said rotatory coordinates Xα-Yα is determined in said computing section.

3. A space coordinates detecting device according to claim 1, wherein the distance between said light emitting section and said detecting section is determined in said computing section on the basis of the distance between the centers of both said light spots and the spacing between both said light sources.

4. A space coordinates detecting device according to claim 1 wherein said detecting section has one aperture and quartered light sensing portions divided in the X and Y axis directions.

5. A space coordinates detecting device according to claim 1 wherein said detecting section has two apertures, bisected light sensing portions divided in the X axis direction for detecting a light spot which has passed through one of said apertures, and bisected light sensing portions divided in the Y axis direction for detecting a light spot which has passed through the other aperture.

6. A space coordinates detecting device characterized in that a light emitting section and a detecting section are disposed in spaced relation to each other, with a substantially linearly polarized light being emitted from said light emitting section, said detecting section having two filters for passing therethrough polarization components inclined in directions reverse to each other relative to the polarization direction of light emitted from said light emitting section, said detecting section further having light sensing portions for sensing the lights which have passed through said filters, and there is provided a computing section which determines a relative rotational angle between the light emitting section and the detecting section on the basis of a difference in the amount of received light between the lights which have passed through said filters.

7. A space coordinates detecting device according to claim 6, wherein when X-Y orthogonal coordinates which intersect an axis connecting said light emitting section and said detecting section are set, one of said light sensing portions can detect a displacement of a light spot in X axis direction, while the other light sensing portion can detect a displacement of a light spot in Y axis direction.

8. An input apparatus using the space coordinates detecting device of claim 1, wherein said light emitting section is disposed on one of a fixed apparatus body side and a movable operating member side, and information relating to a relative rotational angle between the light emitting section and the detecting section with respect to an axis connecting both sections is inputted from said operating member to said apparatus body.

9. A space coordinates detecting device characterized in that a light emitting section and a detecting section are disposed in positions spaced from each other, said light emitting section having two light sources each adapted to emit a distinguishable light and spaced from each other, said detecting section having a plurality of apertures for throttling the lights emitted from both said light sources into light spots of a predetermined area and also having a plurality of light sensing elements for sensing the light spots in opposed relation to said apertures, said apertures being positioned in Y axis direction when arbitrary X-Y orthogonal coordinates are set, one of said light sensing elements being a Y side light sensing element for detecting movement in the Y axis direction of the light spots and the remaining light sensing element being an X-Y side light sensing element for detecting movement in the X and Y axis directions of the light spots.

10. A space coordinates detecting device according to claim 9, including a computing section which determines the positions of the light spots directed to said Y side light sensing element and said X-Y side light sensing element on the basis of the quantity of light received by the Y side light sensing element and that received by a Y side light sensing portion of the Y side light sensing element.

11. A space coordinates detecting device according to claim 9, including a computing section which determines the positions of the light spots directed to said X-Y side light sensing element on the basis of the quantity of light received by an X side light sensing portion of said X-Y side light sensing element and that received by a Y side light sensing portion of the X-Y side light sensing element.

12. A space coordinates detecting device according to claim 9, wherein said detecting section has two apertures, bisected light sensing elements divided in the Y axis direction for detecting a light spot which has passed through one of said apertures, and quartered light sensing elements divided in the X and Y axis directions for detecting a light spot which has passed through the other aperture.

13. A space coordinates detecting device according to claim 9, wherein said light emitting section is disposed on an apparatus body side having a screen, while said detecting section is disposed on an operating member side which operating member is operated manually by an operator.

14. A space coordinates detecting device characterized in that a light emitting section and a detecting section are disposed in positions spaced from each other, said light emitting section having three light sources disposed spacedly from one another and adapted to emit lights distinguishable from one another, said detecting section having a plurality of apertures for throttling the lights emitted from said light sources into light spots of a predetermined area and also having three light sensing elements for sensing the light spots in opposed relation to the apertures, one of said light sensing elements being a Y side light sensing element for detecting movement in Y axis direction of the light spots when arbitrary X-Y orthogonal coordinates are set, another light sensing element being an X side light sensing element for detecting movement in the X axis direction of the light spots, and the remaining light sensing element being an X-Y side light sensing element for detecting movement in both X and Y axis directions of the light spots, said Y side light sensing element and said X-Y side light sensing element being disposed in the Y axis direction, said X side light sensing element and said X-Y side light sensing element being disposed in the X axis direction.

15. A space coordinates detecting device according to claim 14, including a computing section which determines the positions of the light spots directed to said Y side light sensing element and said X-Y side light sensing element on the basis of the quantity of light received by the Y side light sensing element and that received by a Y side light sensing portion of the X-Y side light sensing element.

16. A space coordinates detecting device according to claim 14, including a computing section which determines the positions of the light spots directed to said X side light sensing element and said X-Y side light sensing element on the basis of the quantity of light received by the X side light sensing element and an X side light sensing portion of the X-Y side light sensing element.

17. A space coordinates detecting device according to claim 14, including a computing section which determines the positions of the light spots directed to said X-Y side light sensing element on the basis of the quantity of light received by an X side light sensing portion of said X-Y side light sensing element and that received by a Y side light sensing portion of the X-Y side light sensing element.

18. A space coordinates detecting device according to claim 14, wherein said light emitting section is disposed on an apparatus body side having a screen while said detecting section is disposed on an operating member side which operating member is operated manually by an operator.

19. A space coordinates detecting device characterized in that a light source and a detecting section are disposed in positions spaced from each other, said detecting section having three apertures for throttling light emitted from said light source into light spots of a predetermined area and also having three light sensing portions for sensing the light spots, said apertures being positioned in Y axis direction when arbitrary X-Y orthogonal coordinates are set, one of said light sensing portions being a X side light sensing portion wherein the quantity of light received varies with movement in the X direction of the light spots, and the remaining two light sensing portions being Y side light sensing portions wherein the quantity of light received varies with movement in the Y axis direction of the light spots.

20. A space coordinates detecting device according to claim 19, including an angle computing section which determines the angle of inclination between the direction connecting said light source with said detecting section and Z axis intersecting the X-Y orthogonal coordinates on the basis of the quantity of light received in at least one of both said Y side light sensing portions and that received in said X side light sensing element.

21. A space coordinates detecting device according to claim 19, including a distance computing section which determines the distance between said light source and said detecting section on the basis of the quantities of lights received in both said Y side light sensing portions.

22. A space coordinates detecting device according to claim 19, wherein said light source is disposed on an apparatus body side having a screen, while said detecting section is disposed on an operating member side which operating member is operated manually by an operator.

23. A space coordinates detecting device according to claim 2, wherein said detecting section has one aperture and quartered light sensing portions divided in the X and Y axis directions.

24. A space coordinates detecting device according to claim 2, wherein said detecting section has two apertures, bisected light sensing portions divided in the X axis direction for detecting a light spot which has passed through one of said apertures, and bisected light sensing portions divided in the Y axis direction for detecting a light spot which has passed through the other aperture.

25. An input apparatus using the space coordinates detecting device of claim 6, wherein said light emitting section is disposed on one of a fixed apparatus body side and a movable operating member side, and information relating to a relative rotational angle between the light emitting section and the detecting section with respect to an axis connecting both sections is inputted from said operating member to said apparatus body.

26. A space coordinates detecting device according to claim 10, wherein said detecting section has two apertures, bisected light sensing elements divided in the Y axis direction for detecting a light spot which has passed through one of said apertures, and quartered light sensing elements divided in the X and Y axis directions for detecting a light spot which has passed through the other aperture.

27. A space coordinates detecting device according to claim 11, wherein said detecting section has two apertures, bisected light sensing elements divided in the Y axis direction for detecting a light spot which has passed through one of said apertures, and quartered light sensing elements divided in the X and Y axis directions for detecting a light spot which has passed through the other aperture.

28. A space coordinates detecting device according to claim 10, wherein said light emitting section is disposed on an apparatus body side having a screen, while said detecting section is disposed on an operating member side which operating member is operated manually by an operator.

29. A space coordinates detecting device according to claim 11, wherein said light emitting section is disposed on an apparatus body side having a screen, while said detecting section is disposed on an operating member side which operating member is operated manually by an operator.

30. A space coordinates detecting device according to claim 15, wherein said light emitting section is disposed on an apparatus body side having a screen while said detecting section is disposed on an operating member side which operating member is operated manually by an operator.

31. A space coordinates detecting device according to claim 16, wherein said light emitting section is disposed on an apparatus body side having a screen while said detecting section is disposed on an operating member side which operating member is operated manually by an operator.

32. A space coordinates detecting device according to claim 17, wherein said light emitting section is disposed on an apparatus body side having a screen while said detecting section is disposed on an operating member side which operating member is operated manually by an operator.

33. A space coordinates detecting device according to claim 20, wherein said light source is disposed on an apparatus body side having a screen, while said detecting section is disposed on an operating member side which operating member is operated manually by an operator.

34. A space coordinates detecting device according to claim 21, wherein said light source is disposed on an apparatus body side having a screen, while said detecting section is disposed on an operating member side which operating member is operated manually by an operator.

35. A space coordinates detecting device according to claim 22, wherein said light source is disposed on an apparatus body side having a screen, while said detecting section is disposed on an operating member side which operating member is operated manually by an operator.

* * * * *